(12) United States Patent
Bosley et al.

(10) Patent No.: US 7,054,867 B2
(45) Date of Patent: May 30, 2006

(54) SYSTEMS, METHODS AND PROGRAMMING FOR ROUTING AND INDEXING GLOBALLY ADDRESSABLE OBJECTS AND ASSOCIATED BUSINESS MODELS

(75) Inventors: Carleton J. Bosley, New York, NY (US); Benjamin B. Wilken, Cambridge, MA (US); Gitika Srivastava, Cambridge, MA (US)

(73) Assignee: Skyris Networks, Inc., Cambridge, MA (US)

( * ) Notice: Subject to any disclaimer, the term of this patent is extended or adjusted under 35 U.S.C. 154(b) by 25 days.

(21) Appl. No.: 10/246,793

(22) Filed: Sep. 18, 2002

(65) Prior Publication Data
US 2003/0126122 A1     Jul. 3, 2003

Related U.S. Application Data

(60) Provisional application No. 60/323,354, filed on Sep. 18, 2001.

(51) Int. Cl.
G06F 17/30    (2006.01)
G06F 7/00     (2006.01)

(52) U.S. Cl. ........................................ 707/10; 709/220
(58) Field of Classification Search ................ 707/1–5, 707/10; 709/220–222
See application file for complete search history.

(56) References Cited

U.S. PATENT DOCUMENTS 5,276,871 A * 1/1994 Howarth ..................... 707/201
5,737,601 A * 4/1998 Jain et al. ................... 707/201
2002/0194310 A1 * 12/2002 Chu et al. ................... 709/219
2003/0182428 A1 * 9/2003 Li et al. ..................... 709/227
2003/0208621 A1 * 11/2003 Bowman .................... 709/242

FOREIGN PATENT DOCUMENTS

DE        10143754 A1 *  4/2003
DE       010143754 A1 *  9/2003

OTHER PUBLICATIONS

Clarke, I. "A Distributed Decentralised Information Storage and Retrieval System", Technical Report, Division of Informatics, University of Edinburgh, 1999.*
Kubiatowicz, J. et al. "OceanStore: An Architecture for Global-Scale Persistent Storage", Proceedings of the 9th International Conference on Architectural Support for Programming Languages and Operating Systems (ASPLOS 2000), Nov. 2000.*
Clarke, I., O. Sandberg, B. Wiley and T.H. Hong Freenet: A Distributed Anonymous Information Storage and Retrieval System Proceedings of the International Workshop on Design Issues in Anonymity and Unobservability, pp. 46-66, Jan. 2001.*

(Continued)

Primary Examiner—Luke S Wassum
(74) Attorney, Agent, or Firm—Kolisch Hartwell, P.C.

(57) ABSTRACT

Methods, apparatus, and programming recorded in machine readable memory are provided for the index, search and retrieval of objects on a global network. This inventive system embeds a distributed index in a routing layer to enable fast search. The method provides dynamic insertion, lookup, retrieval, and deletion of participating nodes, objects and associated metadata in a completely decentralized fashion. Nodes can dynamically join and leave the network. This infrastructure can be applied to content networks for publishing, searching, downloading, and streaming.

4 Claims, 17 Drawing Sheets

OTHER PUBLICATIONS

Ohaha "Smart Decentralized Peer-to-Peer Sharing: Taking Gnutella, Freenet to the Next Level", downloaded from www/ohaha.com/design.html, Feb. 4, 2001.*

Zhao, B.Y., J. Kubiatowicz and A.D. Joseph "Tapestry: An Infrastructure for Fault-Tolerant Wide-Area Location and Routing", Technical Report No. UCB/CSD-01-1141, Computer Science Division (EECS), University of California, Berkeley, Apr. 2001.*

Stoica, I. et al. "Chord: A Scalable Peer-to-Peer Lookup Service for Internet Applications", Proceedings of the 2001 Conference on Applications, Technologies, Architectures and Protocols for Computer Communications, pp. 149-160, Aug. 27-31, 2001.*

Dabek, F. "A Cooperative File System", Master's Thesis, Department of Electrical Engineering and Computer Science, Massachussets Institute of Technology, Sep. 2001.*

Rhea, S. et al. "Maintenance-Free Global Data Storage", IEEE Internet Computing, pp. 40-49, Sep./Oct. 2001.*

Dabek, F. et al. "Wide-Area Cooperative Storage with CFS", Proceedings of the 18th ACM Symposium on Operating Systems Principles (SOSP '01), pp. 202-215, Oct. 2001.*

Stoica, I. et al. "Chord: A Scalable Peer-to-Peer Lookup Service for Internet Applications", Jan. 10, 2002.*

Saroiu, S., P.K. Gummadi and S.D. Gribble "Exploring the Design Space of Distributed and Peer-to-Peer Systems: Comparing the Web, TRIAD and Chord/CFS", Proceedings of the 1st International Workshop on Peer-to-Peer Systems, Mar. 2002.*

Lv, Q., S. Ratnasamy and S. Shenker "Can Heterogeneity Make Gnutella Scalable?", Proceedings of the 1st International Workshop on Peer-to-Peer Systems (PPTPS 2002), pp. 94-103, Mar. 7-8, 2002.*

Androutsellis-Theotokis, S. "A Survey of Peer-to-Peer File Sharing Technologies", White Paper, ELTRUN, Athens University of Economics and Business, Greece, 2002.*

Stoica, I. et al. "Chord: A Scalable Peer-to-Peer Lookup Protocol for Internet Applications", IEEE/ACM Transactions on Networking, vol. 11, No. 1, pp. 17-32, Feb. 2003.*

Kubiatowicz, J. "Extracting Guarantees from Chaos", Communications of the ACM, vol. 46, No. 2, pp. 33-38, Feb. 2003.*

Rhea, S., T. Roscoe and J. Kubiatowicz, "Structured Peer-to-Peer Overlays Need Application-Driven Benchmarks", Proceeidng of the 2nd International Workshop on Peer-to-Peer Systems (IPTPS '03), Feb. 2003.*

Rusitschka, S. and A. Southall, German Patent 101-43-754 A1, filed Sep. 6, 2001, English language translation.*

* cited by examiner

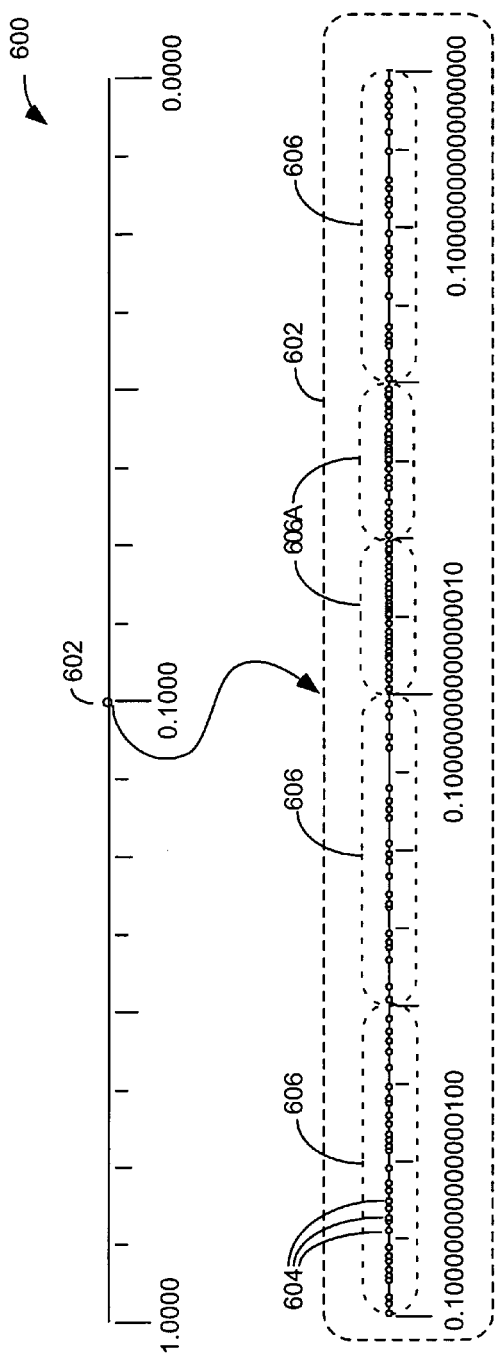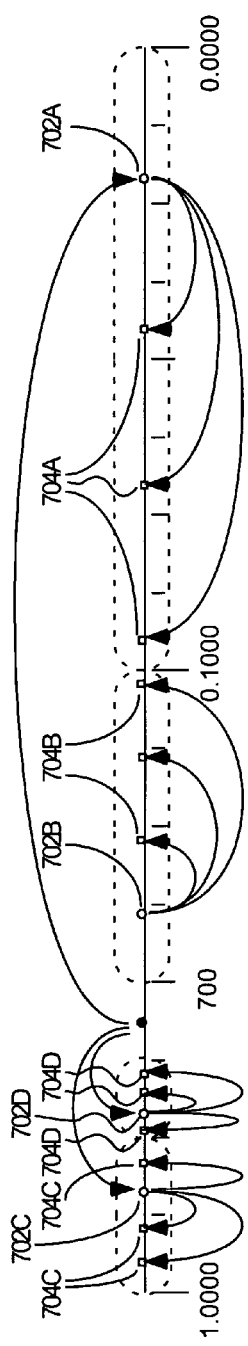

Node x =                x0, x1, x2, x3, x4, x5, x6, x7, ..., xk,... ← 800
It's dir. contact y =   x0, x1, x2̄, x3', x4', x5', x6', x7',.... ← 802
From y, x wants contacts x0, x1, x2̄, d1, d2, d3, d4, d5, d6,....

Y has contacts ← 804

Node Data Structures~900
    -Contact list~902
        -Direct contact list, including for each such contact~904
            -UID~906
            -IP address~908
            -contact status history~910
        -Indirect contact list, including for each such contact~912
            -UID~914
            -IP address~916
        -shared contact list, a list of other nodes for which node is a direct contacts, including for each such other node~918
            -list of node's contacts that other node has been given by node~920
    -Shared neighborhood data~922
        -neighborhood adr mask~924
        -rumor list~926
            -list of neighborhood node UIDs, including for each UID~928
                -list of recent rumors from that node, including for each rumor~930
                    time stamp~932
                    -rumor's content~934
        -keyword entry list, including for each keyword entry~936
            -list of associated files, including for each file~938
                -file's hash value~940
        File name~942
        File size~944
        File type~946
        Other descriptive text-based metadata~948
            -number nodes storing file~950
                -list of other keywords associated with file~952
            -ordered list of file's by number of nodes storing file~954
        -file entry list, including for each file entry~956
            -hash value~958
            -list of hash values of chunks~960
            -list of keywords associated with file~962
            -list of nodes storing file, including for each node~964
                -IP address~966
                -Port number~968
                -Internet connection speed~970
                -Network Location~972
                -if behind a firewall, relay contact information~974
            -Entry Expiration date~976
    -file copy data~978
        -list of file copy entries, including for each~980
            -file's hash value~982
            -the list of hash values of file's chunks~984
            -the file~986
            -list of keywords associated with file~988
            Other text-based metadata about file~990
            -index refresh time, set with shorter first refresh length~992
            -consecutive refresh number~994

FIG. 9

-Node Network Entry~1000
    -establish contact with a known node in network~1002
    -generate two or more new hash addresses~1004
    -for each new hash address~1006
        -perform hash address search to find a node in a neighborhood that handles portion of hash address space corresponding to the new hash address~1008
    -select the neighborhood returned by searches with fewest high order bits in its mask ~1010
    -assign node the new hash address corresponding to selected neighborhood~1012
    -download complete copy of shared neighborhood data from contacted node in selected neighborhood~1014
    -perform contact list creation for node's new hash address~1016

FIG. 10

-Hash Address Search~1100
    -if node's neighborhood address mask matches high order bits of hash address to be searched~1102
        -return from search with current node's UID and node's neighborhood mask and network address~1104
    -make node's contact list the current contact list for purpose of below iteration~1106
    -until get a return from another node that includes a neighborhood mask matching search address, UID of node finding match, and its IP address~1108
        -if there is a set of one or more contacts on current contact list to which search request has not been sent~1110
            -send search request for hash address to the contact in that set whose UID has most significant bits matching search address~1112
        -if don't get replay within timout~1114
            -start again at top of until loop~1116
        -else if get a replay that does not contain a matching neighborhood mask, but does contain a new contact list~1118
            -merge the new contact list with the current contact list ~1120

FIG. 11

-Contact List Creation~1200
    -for i from 0 to k~1202
        -create a new UID by~1204
            -copying the first i-1 significant bits~1206
            -inverting $i^{th}$ most significant bit of node's UID~1208
            -picking a random value for bits less significant than $i^{th}$ bit~1210
        -call New Direct Contact Creation for new UID~1212

FIG. 12

-New Direct Contact Creation (UID)~1300
    -perform hash address search to find a node in neighborhood that handles UID~1302
    -make node found by search the $i^{th}$ direct contact for node~1304
    -store for the $i^{th}$ contact, its~1306
        -UID~1308
        -IP address~1310
        -contact status history (initially empty) ~1312
    -Send a contact request to $i^{th}$ contact requesting a list of indirect contacts having the same most signification bits as the ith contract through the ith bit, and having all possible combinations of the next d-1 most significant bits~1314
    -Store for each $2^{\wedge}(d-1)$ indirect contacts retuned~1316
        -UID~1318
        -IP address~1320

FIG. 13

-Contact Request Response (ithBit)~1400
    -Find list of all of node's contacts that have same most significant bits through an ith bit identified in request, and have all possible combination of the d-1 next most significant bits~1402
    -Send this list of contacts to requesting node~1404
    -For each contact node sent to requesting mode~1406
        -Place entry in node's shared contact list under the requesting other node, recording contacts that have been sent to it~1408

FIG. 14

-Direct Contact Status Update~1500
    -every n seconds~1502
        -for every direct contact of node~1504
            -attempt to communicate with that contact~1506
            -if no communication is received~1508
                -record that communication failed with contact~1510
                -if this is nth consecutive attempt in which attempted communication contact has failed~1512
                      -create a new UID by~1514
                          -selecting the most significant bits of the direct contact to be replaced through first bit that differs from node ~1516
                          -picking a random value for the UID's remaining bits~1518
                -call New Direct Contact Creation for new UID~1520
                -for each other node having entry for the replaced contact in node's shared contact list ~1522
                      -send contact change msg to other node indicating that replaced contact has been replaced, and identify new contact by UID and IP address ~1524
                      -replace replaced contact with new contact in the other node's entry in shared contact list~1526

FIG. 15

-Contact Change Msg Response~1600
    -replace the replaced contact indicated in message with the new contact indicated in message in the nodes contact list~1602
    -for each other node associated with replaced contact in node's shared contact list~1604
        -send contact change msg to other node indicating the replaced and new contacts~1606
        -replace the replaced contact with the new contact in the other node's entry in the shared contact list~1608

FIG. 16

-Rumor Creation~1700
    -If there is a change a given node's shared neighborhood data~1702
        -Create a new rumor detailing the change~1704
        -Label it with given node's UID and a time stamp~1706
        -Place it on given node's rumor list under given node's own UID~1708

FIG. 17

-Rumor Propagation~1800
    -Every n seconds~1802
        -for each node in node's rumor list~1804
            -for each rumor with rumor list node's UID~1806
                -if it is older than a first time length, delete it~1808
            -if current rumor list node of iteration is the node and if there is no rumor with its UID newer than a second time length~1810
                -add a still-here rumor for UID with a current time stamp~1812
            -if the current rumor list node is another node and if there is no rumor with its UID newer than a third time length~1814
                -delete node from rumor list~1816
        -attempt to communicate with another node randomly picked from node's rumor list~1818
        -if communication is achieved~1820
            -if node UID on each side matches other's neighborhood mask~1822
                -each node communicates to other node the UID and time of all recent rumors in its rumor list having a UID matching other node's neighborhood mask ~1824
                -other node indicates which of those rumors it has not yet received~1826
                -the rumors indicated as not yet received by a node are sent to it and it adds them to its rumor list and makes corresponding entries to the node's shared neighborhood data structures~1827
        -else~1828
            -each side of communication deletes other side's node's from its rumor list~1830

FIG. 18

-Neighborhood Splitting~1900
    -if number of neighbors in node's rumor list exceeds upperNeighborLimit~1902
        -increase length of current node's neighborhood mask by one bit~1903
        -add rumor to node's rumor list under node's own UID that node has extended length of its neighborhood mask by one bit~1904
        -if contact list does not include a full list of contacts with k corresponding to new depth of new neighborhood mask~1906
            -call New Direct Contact Creation for contact having a neighborhood mask matching a UID start with node's first k-1 bits, with kth bit flipped, and followed by randomly picked bits~1908

FIG. 19

-Neighborhood-Split Rumor Response~2000
    -if node's UID does not match the changed neighborhood mask indicated in a rumor associated with another node's UID~2002
        -place indication in other node's entry in node's rumor list that~2004
            -other node left network at current rumor's time~2006
            -no rumor communication should be made to node until receive newer rumor for node saying it has a neighborhood mask which match's the node's UID~2008

FIG. 20

-Neighborhood Merging~2100
    -if number of neighbors in node's rumor list falls below lower neighbor limit~2102
        -for each of one or more randomly picked hash addresses in other half of part of hash space defined by one less bit in neighborhood mask than node's current mask~2104
            -do hash address search for that address~2106
            -if node found by search has longer neighborhood mask than node~2108
                -with one of out n probability where n is size of node's neighborhood, send message to other node asking it to re-enter network with a UID with current node's neighborhood mask~2110
        -else~2113
            -send merge request message to other node asking it to merge with node's neighborhood by decreasing the length of its neighborhood mask by one bit~2114
            -node decreases the length of its neighborhood mask by one bit~2116
            -delete direct contact which differs from node's address by lowest order bit and all of its associated indirect contacts~2118
            -performs next rumor communication with node from other half of new neighborhood ~2121

FIG. 21

-Merge Request Response~2200
    -for each of one or more randomly picked hash addresses matching merge requesting node's neighborhood mask~2202
        -perform hash address search address~2204
        -ask node found by search for number of nodes in its neighborhood~2206
    -if sufficient number of found nodes have a neighborhood population justifying a merge~2208
        -if number of nodes in the proposed new neighborhood would exceed upper neighbor limit~2210
            -node reenters network with randomly chosen hash address that matches requesting node's current neighborhood mask~2212
        -else~2214
            -send a merge request via rumor communication to nodeS in current neighborhood~2216
            -node decreases the length of its neighborhood mask by one bit~2218
            -delete direct contact which differs from node's address by lowest order bit and all of its associated indirect contacts~2220
            -performs next rumor communication with node from other half of new neighborhood ~2222

FIG. 22

-New File Network Entry~2300
    -break file into x size chunks~2302
    -hash each chunk~2304
    -set file's hash value to hash of list of chunk hash values~2306
    -find list of keywords to be associated with file~2308
    -for each such keyword~2310
        -find its hash value~2312
    -call copied file network entry for file~2314

FIG. 23

-Copied File Network Entry~2400
    -perform hash address search for file's hash value~2402
    -send file index insert request for file to node returned by hash address search, with node's IP address and information for a file entry for file~2404
    -store the number of node's storing file returned by file index insert request~2406
    -for each of file's keyword~2408
        -perform hash address search for keyword's hash value~2410
        -send keyword index insert request for keyword's hash to node returned by hash address search with node's IP address, and with information for keyword entry for keyword including the number of nodes storing file returned by file index insert request~2412
    -store on node in association with file's hash value~2414
        -the list of hash values of file's chunks~2416
        -the file~2418
        -list of keywords associated with file and their hash values~2420
        -index refresh number set to zero~2422
        -index refresh time, set with shorter first refresh length~2424

FIG. 24

-File Index insert Request Response~2500
    -if there is no file entry for file on node~2502
        -create a file entry for file, including information for node originating request~2504
        -place a rumor in node's rumor list under node's own UID with current time stamp containing new file entry~2506
    -else~2508
        -add to the list of file copy entries for this file, a new file copy entry storing network location information for the requesting node ~2510
        -place a rumor in node's rumor list under node's own UID with current time stamp containing new file copy entry information~2512
    -return with number of entries in nodes storing file entry list~2514

FIG. 25

-Keyword Index insert Request Response~2600
    -if there is no keyword entry for keyword on node~2602
        -create a keyword entry for keyword, including information for file for which request was generated~2604
    -else if the number of nodes storing file accompanying the request is above a minimum required number~2606
        -if there is no associated file entry for request's file in keyword entry's list of associated files~2608
            -create new associated file entry for the file associated with the current request in keyword entry's list of associated files~2610
        -else~2612
            -replace count of nodes storing file for request's file to that in the request~2614
            -reorder files location in ordered list of files by storage count ~2616
    -place a rumor in node's rumor list under node's own UID with current time stamp containing any changes in keyword entry resulting from response to request ~2618

FIG. 26

-file expiration response~2700
    -if the expiration date for a node-storing-file entry in a file entry's list of nodes storing file has expired~2702
        -delete the node-storing-file entry~2704
-if the list of nodes storing file is made empty by the deletion~2706
-for each keyword associated with the associated file entry~2708
            -perform a hash address search for hash of keyword~2710
            -send a message to node returned by search, informing it to remove the file from the associated file list of the keyword's associated entry on that node~2712
-delete the associated file entry~2714

FIG. 27

-file index refresh~2800
    -if file's index refresh time has expired more than x time ago~2802
        -perform Copied File Network Entry for file~2804
    -else if file's index refresh time is about to expire~2806
        -send index refresh message to a node indexing the file copy, with consecutive refresh number~2808
        -increment files corresponding consecutive refresh number~2810

FIG. 28

-file Index Refresh Message Response~2900
    -if index refresh msg is received from a node listed in the list of nodes storing file in the file entry of the file for which entry has been generated~2902
        -set a new expiration date for node storing file entry, as a function of the consecutive refresh number~2904

FIG. 29

-Download File With Hash Value~3000
   -perform hash address search for file's hash value~3002
    -if receive back file's list of hash values of chunks and a list of one or more nodes storing file~3004
      -if received list of multiple nodes storing the file, and if parallel download is appropriate~3006
        -if important to receive file chunks in approximate order they appear in chunk list~3008
          -sequentially place request for different chunks of file from different node in node's download queue, with number of chunk pending download at any one time being limited ~3010
        -else~3012
          -place requests for all chunks of file from different nodes in node's download queue~3014
      -else~3016
        -if important to receive file chunks in approximate order they appear in chunk list~3018
          -sequentially place request for chunks of file from one node in node's download queue, with number of chunk pending download at any one time being limited ~3020
        -else~3022
          -place requests for all chunks of file from one node in node's download queue~3024
   -when start receiving download~3026
     -when receive list of chunk hash values, store it~3028
     -for each chunk download received~3030
        -hash its value~3032
        -compare hash value with values in chunk hash list~3034
        -if chunk's hash value doesn't match corresponding hash value in chunk hash list~3036
          -request chunk again, from a different node if possible~3038
        -else indicate chunk has been received an place it in proper position in copy being created of downloaded file~3040
    -if have not received proper copy of all or part of file by timeout and if file is available from other nodes ~3042
      -request all or missing part from another node~3044
    -if have complete file with proper hash values~3046
      -call copied file network entry~3048
   -if don't receive any download by a timeout~3050
     -repeat process of placing requests in download que, but this time from a different source, if any ~3052

FIG. 30

-Download File With Keywords (keyword list version)~3100
    -for each keyword in keyword search~3102
        -obtain a hash for it~3104
        -use hash address search to find a node that indexes portion of hash space corresponding to keyword~3106
        -send request to keyword's indexing node for list of files in keyword entry's associated file list, which best score against keywords in set, if any~3108
    -if receive back list of files from one or more matching files~3110
        -select best scoring from among them for display to user~3112
    -if user selects a displayed file~3114
        -call download file with hash value, using hash value associated with selected file~3116

FIG. 31

-Download File With Keywords (Bloom filter version)(changes from prior version are marked)~3100A
    -if only one keyword in keyword search~3200
        -obtain a hash for it~3202
        -use hash address search to find a node that indexes portion of hash space corresponding to keyword~3204
        -send request to keyword's indexing node for list of files in keyword entry's associated file list~3206
    -else~3208
        -for each keyword in keyword search~3102
            -obtain a hash for it~3104
            -use hash address search to find a node that indexes portion of hash space corresponding to keyword~3106
            -send request to keyword's indexing node for Bloom filter of files in keyword entry's associated list~3108
        -for each keyword in keyword search~3210
            -send set of bloom filters received in association with other keywords in search to node that indexes that keyword with request for a list of its associated files that best score against the bloom filters associated with the set of other keywords~3212
    -if receive back list of files from one or more matching files~3110A
        -select best scoring from among them for display to user~3112
    -if user selects a displayed file~3114
        -call download file with hash value, using hash value associated with selected file~3116

FIG. 32

SYSTEMS, METHODS AND PROGRAMMING FOR ROUTING AND INDEXING GLOBALLY ADDRESSABLE OBJECTS AND ASSOCIATED BUSINESS MODELS

RELATED APPLICATIONS

This non-provisional U.S. patent application claims priority from U.S. Provisional application 60/323,354 filed on Sep. 18, 2001 by Carleton J. Bosely.

FIELD OF THE INVENTION

The present invention relates to systems, methods and programming for routing and indexing globally addressable objects and associated business models.

BACKGROUND OF THE INVENTION

The rapid adoption of Internet access, coupled with the continuing increase in power of computing hardware, has created numerous new opportunities in network services. Nevertheless, the state of the network is still very similar to that of the internet eight years ago when the web was introduced: heavily based on the client-server model.

In the last eight years, the trends in connectivity and power of PCs have created an impressive collection of PCs connected to the internet, with massive amounts of CPU, disk, and bandwidth resources. However, most of these PCs are never using their full potential. The vast array of machines are still acting only as clients, never as servers, despite the newfound capacity to do so.

The client-server model suffers from numerous problems. Servers are expensive to maintain, requiring money for hardware, bandwidth, and operations costs. Traffic on the Internet is unpredictable: In what is known as the "Slashdot Effect", content on a site may quickly become popular, flooding the site's servers with requests to the extent that no further client requests can be served. Similarly, centralized sites may suffer from Denial-of-Service (DoS) attacks, malicious traffic which can take down a site by similarly flooding the site's connection to the network. Furthermore, some network services, particularly bandwidth-intensive ones, such as providing video or audio on a large scale, are simply impossible in a centralized model, since the bandwidth demands exceed the capacity of any single site.

Recently, several decentralized peer-to-peer technologies, in particular Freenet and Gnutella, have been created in order to harness the collective power of users' PCs in order to run network services and reduce the cost of serving content. However, Freenet is relatively slow, and it is rather difficult to actually download any content off of Gnutella, since the protocol does not scale beyond a few thousand hosts, so the amount of accessible content on the network is limited.

Several research projects which offer O(logn) time to lookup an object (where n is the number of nodes participating in the network and each time step consists of a peer machine contacting another peer machine) are in various stages of development, including OceanStore at Berkeley and Chord at MIT. However, logn is 10 hops even for a network as small as 1000 hosts, which suggests lookup times in excess of half a minute. Furthermore, these systems are designed for scalability, but not explicitly for reliability, and their reliability is untested under real-world conditions running on unreliable machines.

SUMMARY OF THE INVENTION

Skyris Networks, Inc., the intended assignee of this patent application, has developed new, more efficient algorithms for distributed indexing which meet the needs of distributed network services by being scalable and fault tolerant. In this paper we propose a new routing and search scheme which we call "transparent indexing", in which the search index is embedded in a highly scalable, fault tolerant, randomized, distributed routing layer. This routing and indexing layer serves as a distributed directory service, a platform on which to build network services which share these properties and are reliable, efficient, and load balanced.

Our queuing-time based simulations show that SKYRIS can run efficiently on a network with billions of servers. Furthermore, the SKYRIS network can handle any distribution of hot spots (small pieces of popular content), or suddenly popular content, with minor latency compromises, and can do so transparently.

The following design goals are primary to SKYRIS and have determined the direction of our work.

Scalable storage and search Scalability is one of the most important features of SKYRIS. From the beginning, the SKYRIS project has been designed to scale to a global system, with potentially billions of peer machines.

Efficient retrieval Our goal is to make SKYRIS as fast as the Web, if not faster. When doing a lookup on the web of a new domain, one first checks the DNS system, which can make several hierarchical contacts before serving you the IP address. The aim has been to keep the SKYRIS system similarly within several hops, where a hop consists of a message passed from one peer machine to the next. For larger files, there are other methods, such as retrieving from multiple sources simultaneously, which increase system throughput.

Reliability and fault tolerance When machines crash without warning, clients on SKYRIS should still be able to obtain quickly mirrored documents. When the machines come up, they should be able to seamlessly rejoin the network without causing problems. We note that fault tolerance is a major problem for distributed peer-to-peer networks. Such networks are running on users' PCs, which are much less reliable than servers, and furthermore a user may wish to open and close the program more frequently rather than leave it in the background.

Load Balancing The entire network has tremendous capacity, but individual machines lack power. Skyris must spread the load (primarily bandwidth) evenly across the system in order to avoid overloading machines. Skyris is unique in that it has managed to achieve the first system which is both scalable and fault tolerant; furthermore, the platform happens to be efficient and load balanced with some additional effort.

BRIEF DESCRIPTION OF THE DRAWINGS

These and other aspects of the present invention will become more evident upon reading the following description of the preferred embodiment in conjunction with the accompanying drawings:

BRIEF DESCRIPTION OF THE DRAWINGS

Figure 1:
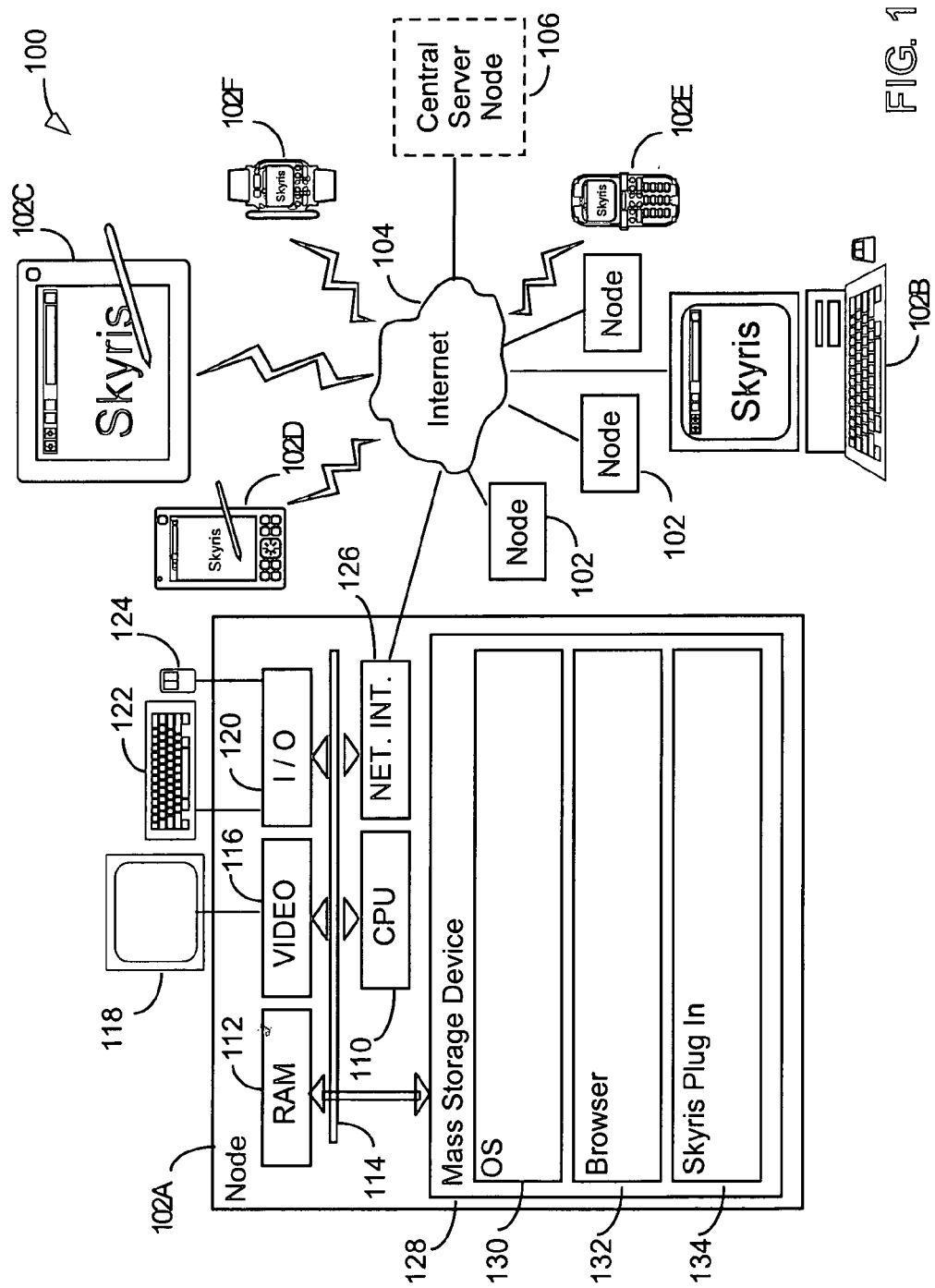

FIG. 1 provides a highly schematic illustration of a Skyris network 100.

Figure 2:
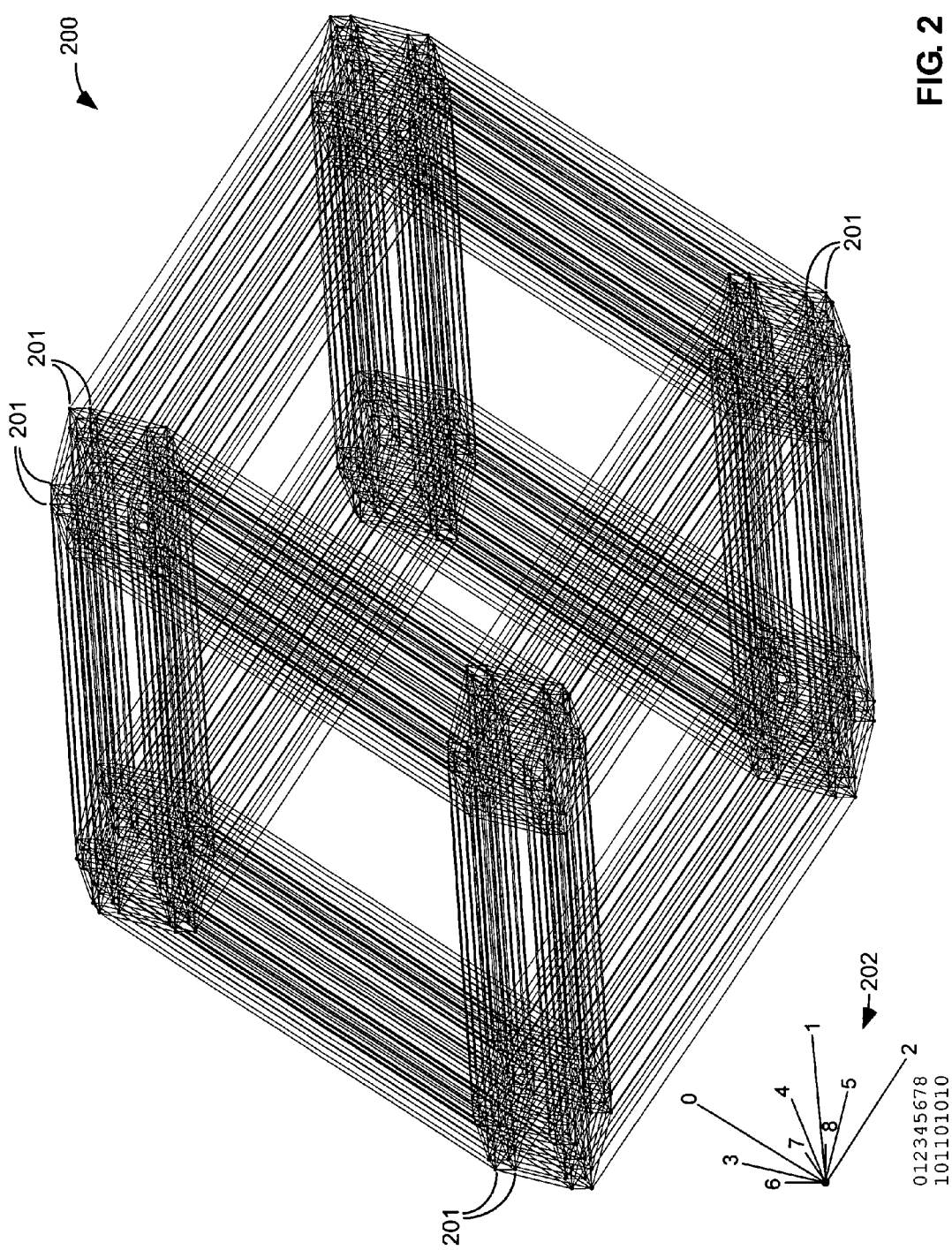

FIG. 2 illustrates nine dimensions of a hypercube 200. As will be appreciated by those knowledgeable of computer network topologies, a hypercube is a networked topology in which each node 201 is connected to another node along each of the multiple dimensions of the hypercube.

Figure 3:
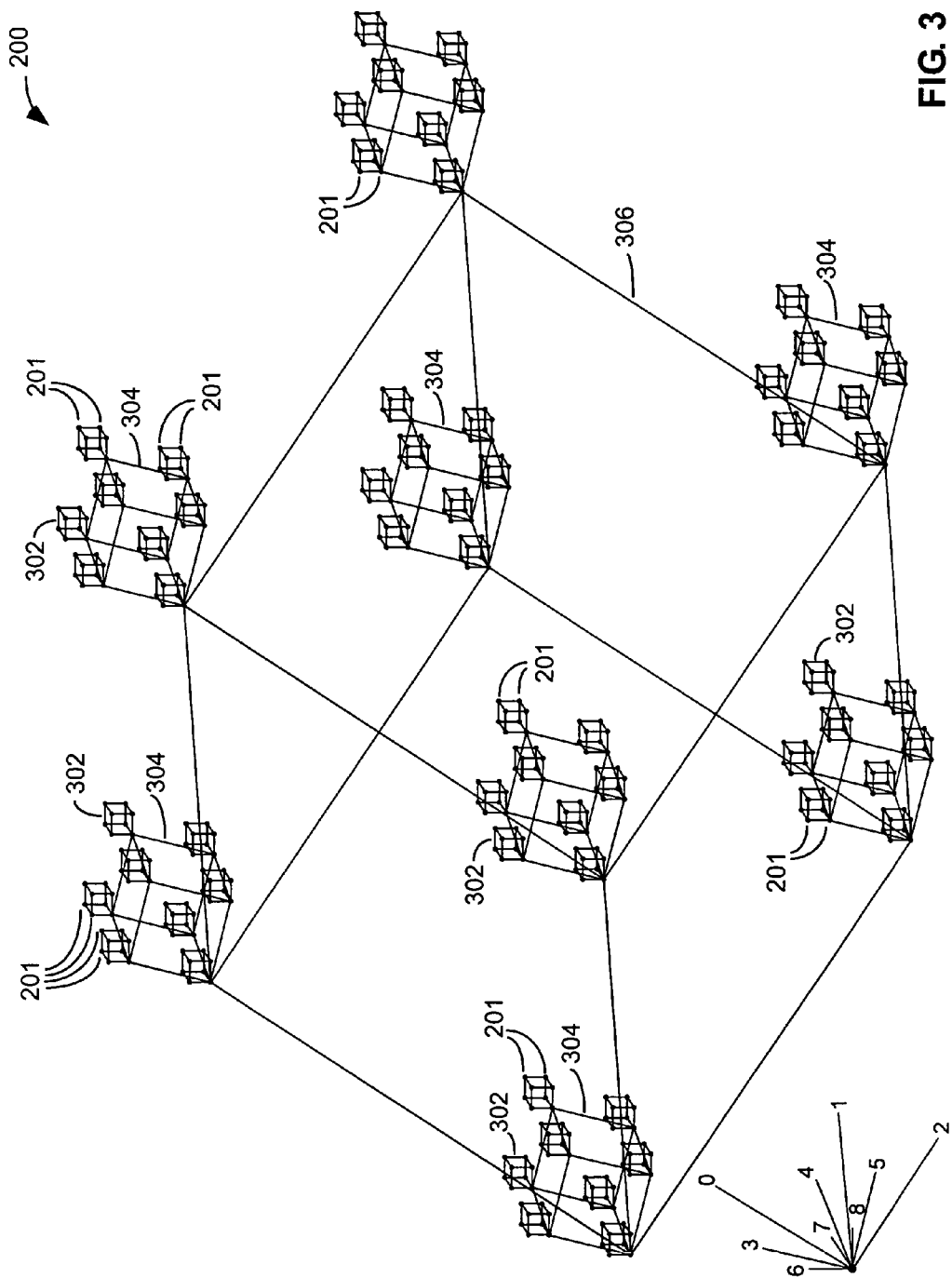

FIG. 3 provides a less cluttered view of the hypercube of FIG. 2.

Figure 4:
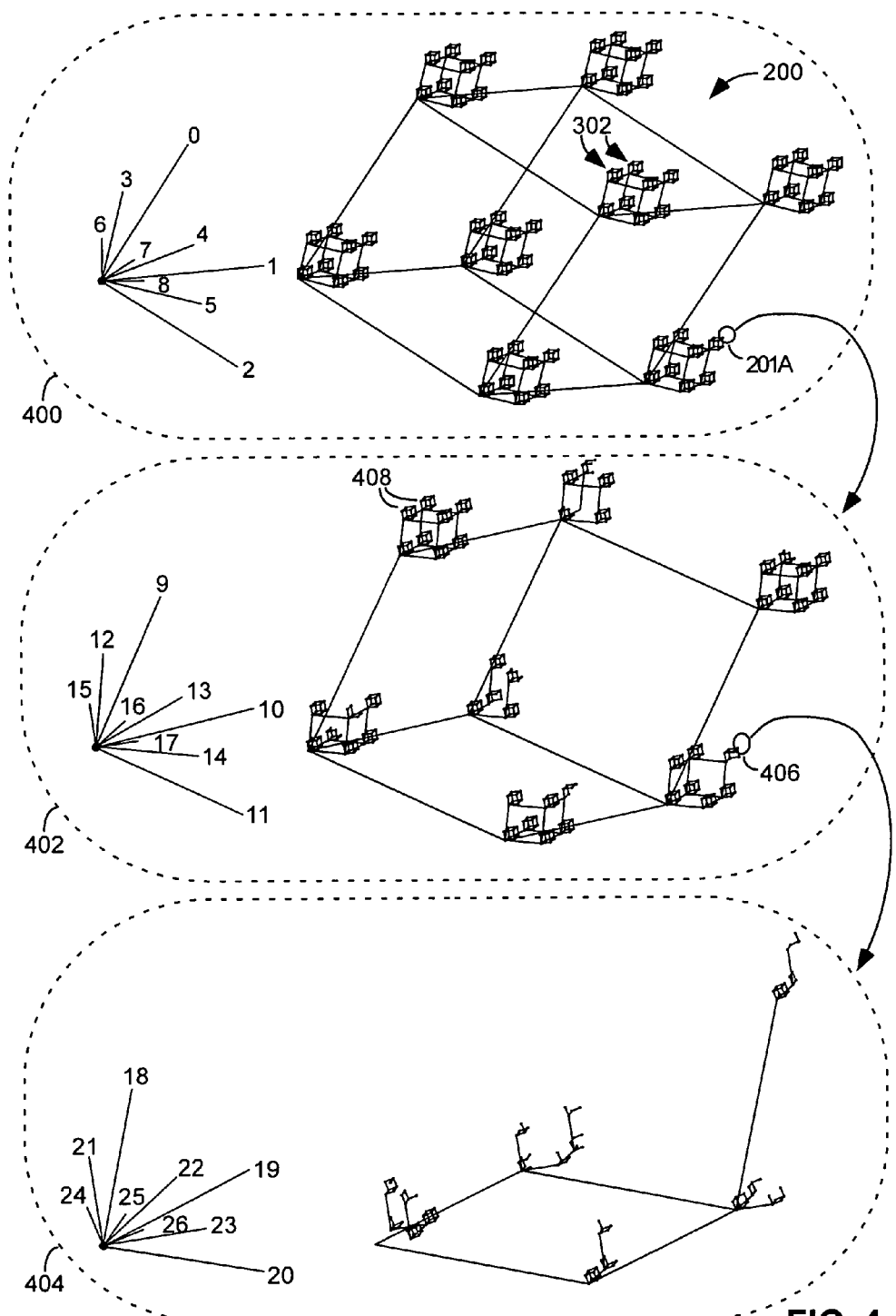

FIG. 4 uses the same method of representing a hypercube shown in FIG. 3.

Figure 5:
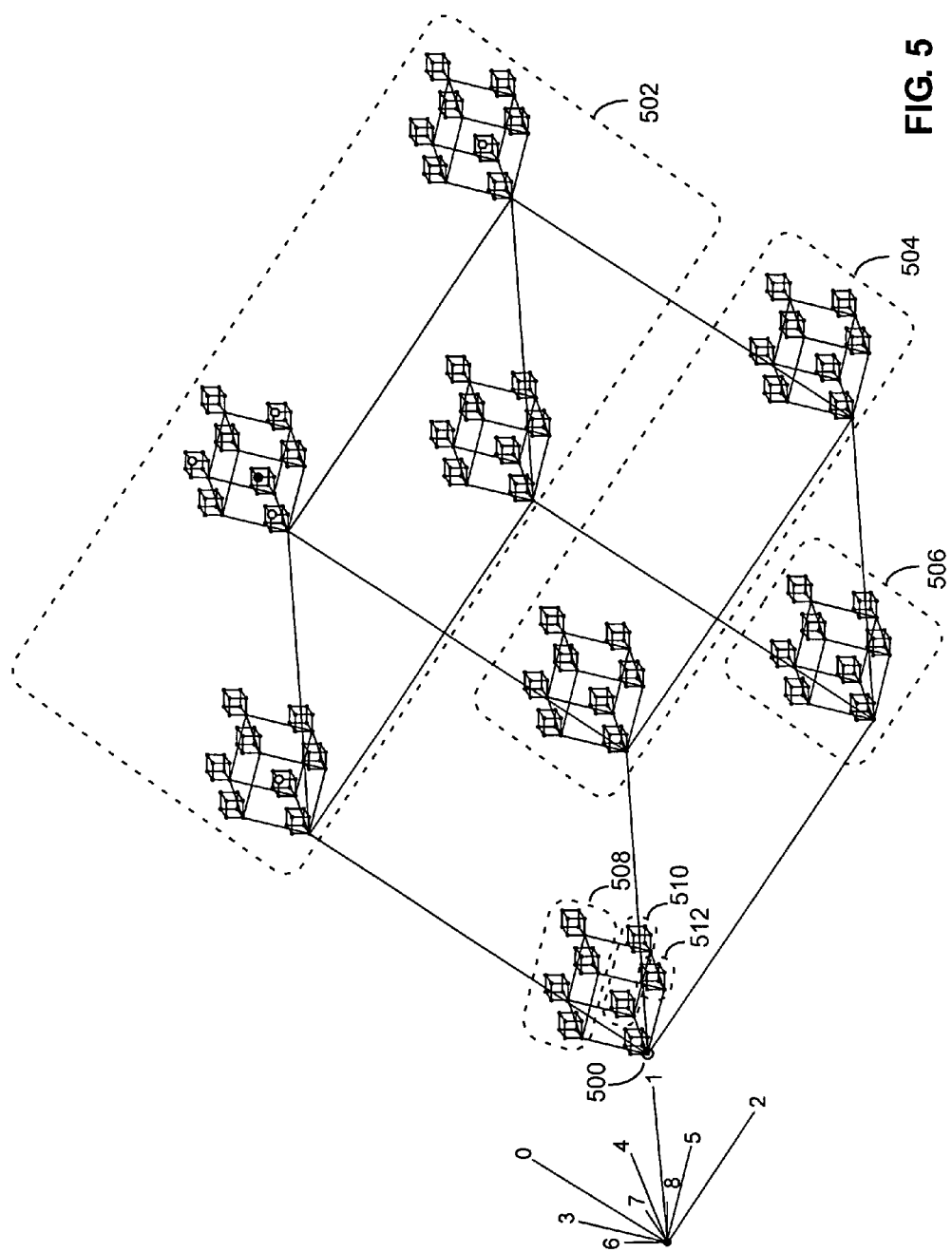

FIG. 5 is similar to the hypercube representation shown in FIG. 3.

FIG. 6 illustrates another way in which the hash address space use with most embodiments of the Skyris network can be represented.

FIG. 7 represents the hash address space in the same linear manner as was used in FIG. 6.

Figure 8:
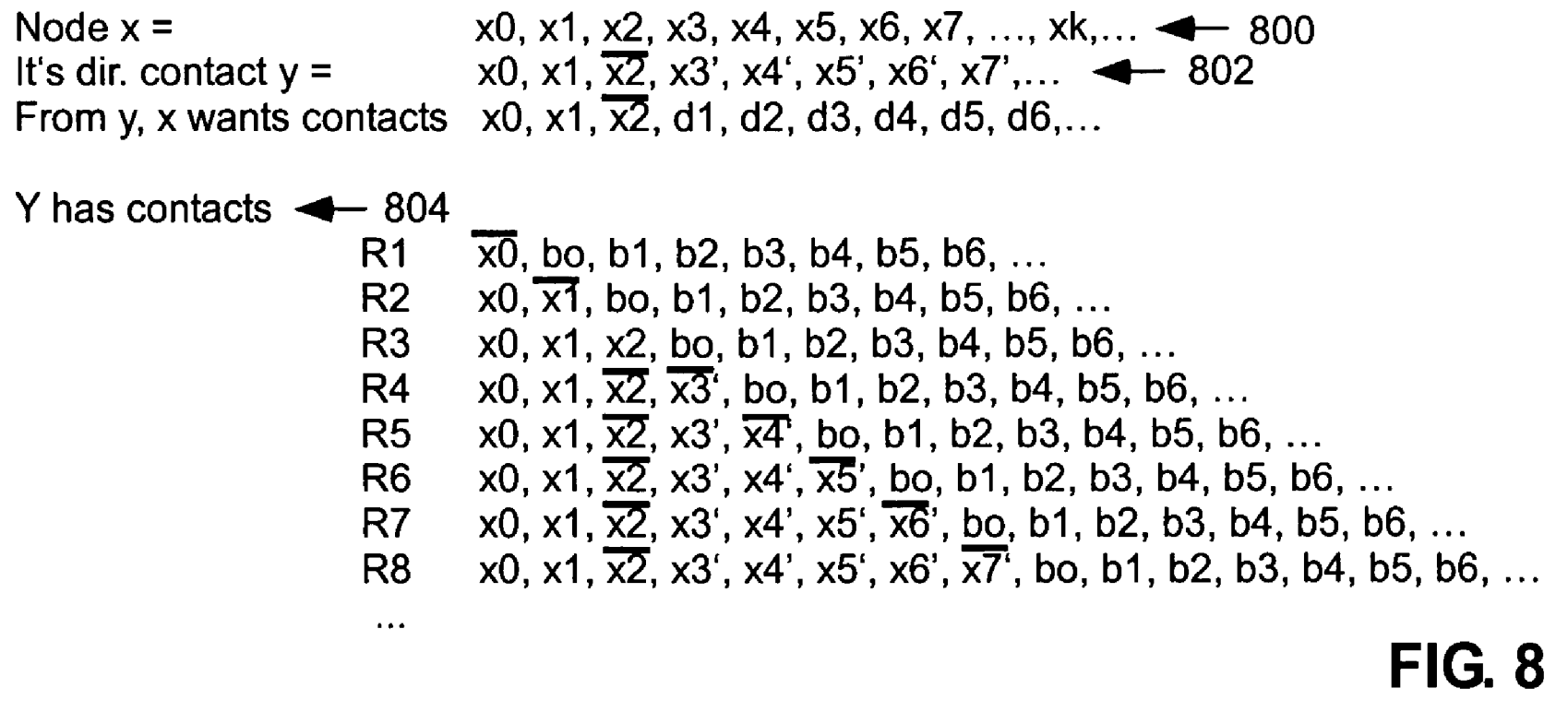

FIG. 8 illustrates in more detail the nature of the set of indirect contacts which are returned by a given direct contact.

FIG. 9 illustrates the data structures 900 that are stored in association with the Skyris software 134 shown in FIG. 1.

FIG. 10 illustrates how a node enters the Skyris network, either when it is entering it for the first time or reentering it after having left the network.

FIG. 11 describes how a node performs a hash address search of the type described above with regard to function 1008.

FIG. 12 describes the contact list creation function 1200 which is used to create a contact list for a new node.

FIG. 13 illustrates that once this new UID value has been created, function 1212 calls the new direct contact creation function 1300.

FIG. 14 is a contact request response function 1400, which a node performs when it receives a contact request of the type sent by a node when performing function 1314, described above with regard to FIG. 13.

FIG. 15 describes the direct contact status update function 1500.

FIG. 16 illustrates the contact change message response function 1600, which a node performs when it receives a contact change message of the type, described above with regard to function 1524 of FIG. 15.

FIG. 17 illustrates the rumor creation function 1700.

FIG. 18 describes the rumor propagation function 1800, which is used to communicate rumors between nodes of a given neighborhood.

FIG. 19 illustrates a neighborhood splitting function 1900.

FIG. 20 describes the neighborhood-split rumor response function 2000.

FIG. 21 describes the neighborhood merging function 2100.

FIG. 22 Function 2216 sends a merge request the via rumor communication to nodes in the current node's neighborhood. This will cause all nodes that receive this rumor to perform the merge request response function of FIG. 22.

FIG. 23 illustrates the new file network entry function 2300.

FIG. 24 illustrates function 2314 which calls the copy file network entry function 2400.

FIG. 25 illustrates the file index insert request response function 2500.

FIG. 26 describes a keyword index insert request response.

FIG. 27 illustrates the file expiration response function 2700.

FIG. 28 illustrates the file index refresh function 2800 that is performed by an individual node storing a copy of a given file.

FIG. 29 illustrates a file index refreshed message response function 2900 which is performed by node that receives any index refreshed message of the type described above with regard to function 2808 to FIG. 28.

FIG. 30 illustrates the download file with hash value function 3000.

FIG. 31 illustrates the download file with keywords function 3100.

FIG. 32 illustrates the download file with keywords (Bloom filter version) function 3200.

DETAILED DESCRIPTION OF SOME PREFERRED EMBODIMENTS

We present a new routing and indexing framework, and a specific scheme that is fault tolerant and scalable, using only local information, to as many as billions of PCs. Other systems do not scale as well as ours. OceanStore, which is based on algorithms of Plaxton, is notable for attempting scalability; Also notable is the Chord project at MIT, which scales with O(logn) lookup time, where n is the number of nodes in its system, but which is not especially designed to be and does not appear to be fault tolerant enough to scale to large networks.

This routing and indexing scheme is the core enabling piece of the SKYRIS project. Together with a new, related method of hot spot management, our routing and indexing scheme allows the construction of many useful, efficient, scalable, and fault tolerant services, including keyword search as well as distributed information retrieval and delivery, with the properties of the Skyris network.

The core of the system consists of several distinct layers:
Routing (Table and Protocol)
Indexing (Table and Protocol)
Hot Spot Management The interface to the platform is simple, thus additional layers, such as search and storage of content, can easily be built on this central framework.

Routing

FIG. 1 provides a highly schematic illustration of a Skyris network 100.

In this network, a plurality of nodes 102 are connected via a network such as the Internet 104 shown in FIG. 1. The Skyris network can have a central server 106 in some embodiments. In other embodiments, each can operate without such a central server.

As illustrated in FIG. 1, the Skyris network can be used with many different types of computing devices. At the current time, the most common types of computing devices which would have the capacity to act as nodes in the Skyris network would tend to be desktop computers, such as computer 1 shown in FIG. 1, laptop computers, and other larger computers. However, as the capacity of smaller electronic devices grow, in the future the Skyris network will be capable of being used with smaller types of computers, such as portable tablet computers 102C, personal digital assistant computers 102D, computers based in cellular telephones 102E, and computers in smaller devices, such as wearable computers like the wristwatch computer 102F shown in FIG. 1.

The nodes of the Skyris network can be connected to the network with relatively slow connections such as cable modems or currently common forms of cellular communication. However, a node will receive better service from the network, and be more valuable to the network, if it has a higher speed connection, such as a cable modem, DSL, wireless LAN, or high-speed wireless connection.

In FIG. 1, node 102A is represented with a schematic block diagram. This diagram illustrates that the node has a central processor 110; random access memory 112; a bus 114 connecting the CPU and the memory; and a video interface 116 for driving a visual display 118. This computer also includes an I/O interface 120 for interfacing with user input devices, such as a keyboard 122 and mouse 124. It also includes a network interface 126 for enabling the node 102A to communicate with other nodes 102 of the Skyris network.

The node 102A also includes a mass storage device, such as a hard disk, floppy disk, CD ROM, or a large solid-state memory. This mass storage device stores the programming instructions of an operating system 130; a browser program 132; and Skyris programming in the form of a plug-in 134.

In some embodiments, the Skyris program will run as an independent application. But, in many embodiments, it will operate as a plug which will enable users to access content using the Skyris network from within the browser interface generated by the browser program 132.

The SKYRIS network is designed to scale to millions, perhaps billions, of PCs and other types of computers.

But each host will have a fixed storage capacity, a far smaller memory capacity, and a varying network bandwidth, possibly as slow as a modem. We wish to allow any server to find and communicate with any other server. Thus one of the foundations of the network must be a routing algorithm with a low diameter and variable network overhead.

Furthermore, we expect these machines to frequently fail (crash, reboot, disconnect from the network, shut down the Skyris program, be connected to a network which fails, etc.), so we must replicate information. Our approach is to create local "neighborhoods", or groups of nodes, of manageable size, so that each neighborhood proactively replicates the local index and contact information for the machines in the neighborhood, via broadcast (likely through multicast). Thus, nodes will frequently die, but the neighborhood is large enough that it is highly improbable that all of a neighborhood disappears before the network is given a chance to react. (In other portions of this application and the claims that follow we also refer to such neighborhoods as "logical nodes".)

Furthermore, we expect new servers to join our network. Thus our routing system needs to be not only fault tolerant (capable of deleting nodes), but also capable of adding new machines to the network on the fly.

We develop a new routing algorithm to solve this problem based on existing discrete routing networks operating not on individual machines, but on our "neighborhoods". When a neighborhood size gets too large, we split neighborhoods in two. If a neighborhood size becomes too small, we coalesce two neighborhoods into one.

We have generalized two classic network models to the Skyris framework. They are the hypercube model and de Bruijn networks of size $2^k$. Advantages of the hypercube are throughput efficiency, at the cost of a large number of links, and simpler neighborhood mangement. Advantages of de Bruijn are the tiny number of links, but throughput efficiency is reduced, and fault tolerance is lessened.

Note that with the neighborhood concept, which includes dynamic splitting, it is similarly possible to use other network models; the two main requirements for a network model are that there is enough locality (adjacent neighborhoods are close to one another) and enough flexibility in the family of parameters describing the network. The second condition requires that the routing model, given a network of size n, can expand to a similar routing model of size nk, with k small—in the above examples k=2. Hypercube is the best network model for both locality and ease of splitting, but the de Bruijn model is one example of another classic network model which can be adapted. In this case the difficulty is greater—splitting neighborhoods requires reassignment of half the contacts of a machine, for example—but the number of contacts is fewer.

It is also worth noting that if desired, the neighborhood concept may be altered so that adjacent neighborhoods overlap to some extent, perhaps in a probabilistic manner; or so that each machine be assigned to two or more neighborhoods, perhaps based on the bandwidth of the machine, et cetera; there are various simple modifications of the concept. A thread that ties these together is that they retain some notion of locality of machines, perhaps through a distance function, which replicate information among some collection of nearby hosts. The set of hosts receiving information may vary according to connection speed or usefulness of the machine, and may also vary according to the information. Indeed, in order to handle 'hot spots' of popular content, we will replicate the information to larger neighborhoods based on the popularity of the content.

We intend to use the generalized hypercube algorithm together with a specialized scheme for caching contacts, which combines the best aspects of hypercube (fault tolerance), de Bruijn (few links), and the randomized model (allows scaling the network). We now describe the generalized hypercube routing algorithm.

The Randomized Hypercube Model

In our randomized hypercube model, each of the n servers obtains a unique 160-bit hash key in the interval [0,1) using the SHA1 hash function. (SHA1 was chosen for its cryptographic properties of collision resistance; it is easy to use a different hash function instead if desired, even one with fewer bits. The system needs to be collision resistent, thus the number of bits should be at least twice the log of the number of objects in the system in order to have low probability of this occurring, and it should be cryptographically resistent so that files cannot be manufactured which match existing files, that is, it is not easy to generate x such that $h(x)=h(y)$ for a given y. For a billion objects, this is about at least 60 bits; for a trillion it is 80 bits. Therefore 160 is more than necessary.) This hash key (the node ID) describes the server's "location" in the interval. Each server is assigned a list of contacts (a contact is a server that the server "knows" exists) with which it communicates directly.

FIG. 2 illustrates nine dimensions of a hypercube 200. As will be appreciated by those knowledgable of computer network topologies, a hypercube is a networked topology in which each node 201 is connected to another node along each of the multiple dimensions of the hypercube.

In FIG. 2 in which nine dimensions are shown each node 201 is connected to nine other nodes, with the connection to each of those nine nodes being along a different dimension.

In FIG. 2 each of the nine dimensions shown that figure are indicated at 202. Since it is difficult to represent more than three dimensions on a two-dimensional piece of paper, the connections associated with the dimensions 0, 1, and 2, are shown having a larger space between nodes than connections at dimensions 3 4 and 5, and these dimensions in turn are shown having larger spacing between contacts that exists in dimensions 6, 7, and 8.

In FIG. 2, in order to make the dimensions more easily separable we have drawn the cube defined by the three smallest dimensions 6, 7, and 8 as being relatively small, and with the cube of cubes shown in that figure formed by the intermediate dimensions 3, 4, and 5 being larger, and the largest three dimensions 0, 1, and 2 defining an even larger cube of cubes.

FIG. 3 provides a less cluttered view of the hypercube of FIG. 2. In it, most of the lines connecting each node 201 of a hypercube along each of its dimensions have been removed so that the individual nodes 201 are more visible and so that the representation of the hypercube as a cube 306 made up of intermediate size cubes 304 which in turn are made of smaller cubes 304 can be seen.

FIG. 4 uses the same method of representing a hypercube shown in FIG. 3, except that it provides three different views of this hypercube representing different subsets of its dimensions. The portion of FIG. 4 encircled within the dotted line 400 corresponds to that shown in FIG. 3, which illustrates the first nine dimensions of the hypercube. The portion of FIG. 4 shown within the dotted line 402 is a blowup of what appears to be an individual node 201*a* within the dotted circle 400. This blowup shows the next nine dimensions 9 through 17, for the hypercube. It should be appreciated that each individual corner of each of the small rectangles 302 shown in FIG. 3 and FIG. 4 actually correspond to a hierarchy of cubes defined by the smaller dimensions of the hypercube representation. It should be appreciated that each actual node in this higher dimensional hypercube is connected by all dimensions of the hypercube to any other node which varies from it only by the value of the bit represented by that given dimension.

The 160 bit hash value used in the current embodiment of the Skyris network represents a binary number large enough to represent over a trillion trillion trillion possible values. Thus even if a given Skyris network has a large number of nodes, only a very small percent of the possible values that can be defined by such a large binary value will actually have a node associated with them. For this reason if the 160 bit hash value is represented as a hypercube, that hypercube will be largely empty. This is illustrated by FIG. 4 in which the hypercube formed by a large set of nodes, such as a billion nodes would look quite full when looking at only the nine highest order bits of the hash address space, because in the hierarchical cubic representation shown in that figure each corner of one of the smallest cubes 302 shown in the portion of the figure encircled by the dotted lines 400 would tend to have some value associated with them, since each such corner would represent 1/512 of the entire address space, and would be almost certain to have some nodes fall within that portion of the total address space.

But if one examines the address space more closely as is shown in the portion of FIG. 4 encircled by the dotted line 402, where each corner of each of the smallest rectangles 408 represent 1/262144 of the hash address space, and thus even in a network with approximately one million nodes, the portion of the address space represented by such corners will not always have one or more associated nodes, as is indicated by the fact that the portion of the hypercube space shown encircled by the dotted lines 404 is not totally filled in.

The portion of FIG. 4 encircled by the dotted line 404 shows a blowup of that portion of the hypercube space surrounded by the circle 406 within the view of the hypercube space shown encircled by the dotted line 402. The portion of the hypercube space shown encircled by the dotted lines 404 represents the 18th through 26th dimensions out of the 160 dimensional space represented by all possible hash values. In the example shown in FIG. 4 this portion of the hypercube space is sparsely populated causing it to look quite sparse and irregular.

Let x and y be two node IDs, and assume we use SHA1. Let $x=x_0 x_1 \ldots x_{159}$, where $x_i$ represents the ith bit of x. Similarly, let $y=y_0 y_1 \ldots y_{159}$. Consider the distance function $d(x,y)=2^{-f(x,y)}$, where $f(x,y)$ is defined such that $f(x,x)=0$ and $f(x,y)=k+1$, where $\forall i, i<k, x_i=y_i, x_k \neq y_k$. Intuitively, $f(x,y)$ is the location of the first high-order bit for which x and y differ.

In the basic hypercube model, given a server X with a node ID of x, for each i such that $0 \leq i < \log n$, X is given one random contact Y with a node ID of y such that $d(x,y)=2^{-i}$.

Thus, X has logn contacts with node Ids constrained as ("-" indicates no constraint):

$$\overline{x_0} = \underbrace{\ldots}_{159},$$

$$x_0 \overline{x_1} = \underbrace{\ldots}_{158},$$

$$x_0 x_1 \overline{x_2} = \underbrace{\ldots}_{157},$$

$$\vdots$$

$$x_0 x_1 \ldots x_{k-1} \overline{x_k} = \underbrace{\ldots}_{159-k},$$

where $k=\log n$ and $\overline{b}$ denotes the complement of b.

In other words, in the randomized hypercube model, each node has a contact in the other half of the search space, the other half of its half, the other half of its quarter and so on.

This is illustrated in FIG. 5, which is similar to the hypercube representation shown in FIG. 3. If the giving node X has the position 500 shown in FIG. 5, then the contact $$\overline{x_0} = \underbrace{\ldots}_{159} =$$

will be at some random location in the portion of FIG. 5 encircled by the dotted line 502; the contact $$x_0 \overline{x_1} = \underbrace{\ldots}_{158} =$$

will be at some random location encircled by the dotted lines 504; the contact $$x_0 x_1 \overline{x_2} = \underbrace{\ldots}_{157} =$$

will be at some random location encircled by the dotted lines 506; the next contact in the sequence will be located at some random position encircled by the dotted lines 508; the contact after that will be located within the dotted lines 510, and the contact after that will be located within the dotted lines 512.

FIG. 6 illustrates another way in which the hash address space use with most embodiments of the Skyris network can be represented. In this representation a binary decimal point is placed before the 160 bit hash value so that its bits represents a value in range 0 and a number that varies only by less than one trillionth of one trillionth of one trillionth from the number one.

In FIG. 6 a portion 602 of this range is shown in expanded form. This portion of the address space range corresponds to approximately 1/32768 of the address space. It corresponds to the part of the address range that between 0.1000000000000010 and 0.1000000000000000. In it individual nodes are represented by the small circles 604. It can be seen that the distribution of the nodes across this subset of the range involves a fair amount of statistical unevenness.

In FIG. 6, portions of the address range corresponding to neighborhoods are indicated by the dotted lines 606. As will be explained below in greater detail the portion of the hash address space which corresponds to a given neighborhood varies so each neighborhood can maintain a relatively constant population despite statistical variation in node populations in different sub portions of the hash value address space. This is illustrated in FIG. 6 by the fact that the two neighborhoods 606A cover a smaller portion of the address space than in the other neighborhood shown in that figure. This is because their portion of the address space is shown having a higher density of nodes.

The node therefore has a set of direct contacts with exponentially increasing density as you get closer to it. Thus, the basic hypercube model (which will be extended) is quite comparable to the routing model of the Chord project, and achieves the same results: O(logn) lookup time with logn contacts per node. However, at this point already we are fault tolerant, because of our use of neighborhoods, and Chord and other scalable systems are not.

Furthermore, each local neighborhood (the set of approximately $n/2^m$ nodes who share the same first m bits, for some small m) keeps track of all nodes within it. So once the searcher contacts a node in the local neighborhood, that node knows the final destination and can forward it directly on. Of course, since each node in a neighborhood maintains copies of the same index information, most searches need to go no further than reaching any node within the same neighborhood as a desired node address or hash value.

This model has the property that a server can find the closest node to any given hash value by passing its message to its closest contact to that node. If x is trying to find y and $d(x,y)=2^{-i}$, then x has a contact z such that $d(z,y) \leq 2^{-(i+1)}$. $f(z,y)=i+j$ with probability $2^{-j}$, and so we get $E[f(z,y)]=i+1.5$. Thus, seek time is at most $\log(n-m+1)$, with average seek time $$\frac{\log(n-m+1)}{2}.$$

We also note that various other routing protocols in hypercube networks exist, and can be adapted in the straightforward manner to our randomized neighborhood network. These protocols allow better load balancing at high cost.

The basic model has several problems, though. A search taking time O(logn) quickly grows beyond the time the user is willing to wait. Furthermore, the routing table is still somewhat fragile, and we must prevent the network from partitioning when nodes or links die. The neighborhood routing is quite solid, but the hypercube at this stage is less reliable.

Thus, we propose the following solution, which achieves search times of $$\frac{\log n}{d+1}$$

on average, and $$\frac{\log n}{d}$$

maximum, where d is a constant, probably near 7, with an expansion of the routing table to include $2^{d-1}$ logn contacts. Each client builds an index of d levels of contacts, where contacts in the d-th level are those that have paths of length d to the node (as defined by chain of connection through direct contacts). However, to do this with all connections is extremely wasteful. Therefore we only exchange certain contacts: if $d(x,y)=2^{-i}$, then y gives x only its closest-level contacts z for which $d(x,z)=2^{-i}$, $2^{-i-d} \leq d(y,z) \leq 2^{-i-1}$, $d(z_1, z_2) \geq 2^{-i-d}$.

In other words, y looks at the interval of its contacts z which it is authoritative for, divides it into intervals of length $2^{-i-d+1}$, and passes one contact from each interval on to x. x the contact that is 2 levels away. This is continued recursively so that:

$X=x_0 x_1 \ldots x_{159}$ has contacts $$\overline{x_0} b_0 \ldots b_{d-2} \overset{160-d}{=\cdots=},$$

$$x_0 \overline{x_1} b_0 \ldots b_{d-2} \overset{159-d}{=\cdots=},$$

$$x_0 x_1 \overline{x_2} b_0 \ldots b_{d-2} \overset{158-d}{=\cdots=},$$

$$\vdots$$

$$x_0 x_1 \ldots x_{k-1} \overline{x_k} b_0 \ldots b_{d-2} \overset{160-k-d}{=\cdots=}$$

for all $2^{d-1}$ values of $b_0 b_1 \ldots b_{d-2}$, for a total of approximately $2^{d-1}$ logn contacts.

FIG. 7 represents the hash address space in the same linear manner as was used in FIG. 6. It shows a node 700 and has direct contacts 702A through 702D. Actually it would include other direct contacts that are even closer to it, but drawing them in FIG. 7 would have been difficult because of their closeness to the node 700. Each of the direct contacts such as the direct contacts 702a through 702D shown in FIG. 7 supply the node 700 with a corresponding list of indirect contacts 704. The indirect contacts returned by each direct contact lie within the sub-portion of the hash address space in which the direct contact was randomly chosen. And because the indirect contacts have all values for the set of D-1 bits immediately after the most significant bit by which the direct contact first differs from the node 700 that is being supplied with contacts, the indirect contacts supplied by a given direct contact will be distributed in a substantially even manner over the sub-range of the address space associated with their corresponding direct contact.

FIG. 8 illustrates in more detail the nature of the set of indirect contacts which are returned by a given direct contact.

In this figure the row of bits pointed to by the numeral 800 is defined as the bit pattern of the node x, to which a set of contacts is to be supplied by a node y. The row 802 illustrates the bits of the address value of the node y. As can be seen from the figure the first two bits of y's address are identical to x's address but the third bit of y, x2 bar, is the inverse other third bit out of x, which is x2. As is shown in FIG. 8, node x wants from node y a set of indirect contacts that have the same bits in their hash address as y itself does up to the first bit by which y differs from x. In the example, it wants a set of 64 such contacts from y, which have all possible values for the bits d1 through d6.

In FIG. 8 the table 804 shows a subset of y's contact list, which is a list of both its direct and indirect contacts. In this table the values b0 through b6 represent a set of all possible values for the high order bits of the hash address space they occupy. As can be seen by examining rows R3 through R8 in FIG. 8, if y has a fully developed contact list it should contain all the contacts that it needs to satisfy x's request. Row R-4 has all of the contacts sought by x except the ones with x3' rather than bar x3'. R5 has all of the requested contacts not contained in R-4 except those with x4' rather than bar x4'. R-6 has all of the requested contacts not contained in R4 and R5 except those with x5' rather than bar x5'. R7 has all of the contacts not contained in R4 through R-6 except those with x6' rather than bar x6'. R8 has all the requested contacts not contained in R4 through R7 except those with x7' rather than bar x7'. In most cases the direct contact will have enough rows such as the rows R4 through R8 that it can supply a node requesting contacts with all of the contacts that it needs.

In this graph we find that node X has $$(\log n)\binom{d-1}{i}$$

contacts at level i. When no nodes fail, path lengths are bounded by $$\frac{\log n}{d},$$

the average path has length $$\frac{\log n}{d+1},$$

and the amount of network traffic per host sent to maintain contacts is O(logn)

Thus, the manner in which we cache contacts has numerous nice properties which distinguish it from previous routing mechanisms. In particular, it preserves and enhances locality; it maintains routing tables which are up-to-date (a node knows that it's d-th level contact was alive a short time ago, since contacts are replaced in successive layers after inactivity); and its performance benefits are high, requiring only a constant factor more activity. Furthermore, though the bandwidth (counted as number of bits sent) is increased, the number of messages remains the same, since nodes still talk to their direct contracts at various time intervals, only exchanging more information. This shows that a simple ping/ack scheme is wasteful, since this scheme not only sends better information, but sends it in the same number of messages, perhaps even the same number of packets and therefore the same amount of network traffic.

Once this network is built, it should be relatively easy to maintain. If a node goes down, the nodes that use it as a direct or indirect contact will have enough other contacts to reach the rest of the network. When a node is added, it can find appropriately located nodes to build its list of contacts. Indeed, our queueing-time based simulations confirm this.

The question remains—how, then, do we start to build this network with an online algorithm, while nodes arrive one at a time?

At startup, we designate a single node as the oracle, or host cache, which will likely be running on our hardware (although it can be any known node, as will be explained below in greater detail)). The oracle will maintain a radix search tree or other optimized data structure of all current servers registered on the network and will answer closest node queries. Each time a new node is added to the network, the node sends the oracle its node ID and a list of desired locations of contacts. The oracle then inserts the node into the search tree and sends back the node IDs of the closest matches.

However, if these contacts are left in place, the network constructed is not the same as the randomized network described above. Thus, we require nodes to add new contacts frequently. One way to do this relies on the host cache: when the jth node is inserted, the oracle also sends an updated list of contacts to node $j-2^{\lfloor \log(j-1) \rfloor}$. In this way, each node gets an updated list of contacts approximately every time the network doubles in size. The oracle repeats this process until its node storage is full of contacts. At this point the oracle starts randomly dropping node contact information and replacing it with that of the newest nodes to arrive, and also performs searches of the network to continually discover which nodes are still alive. The network will now be more stable since it does not double in size as quickly, and we can now place the burden of updating contacts on the nodes themselves; each node can search every so often to update their contacts. In this way we maintain a connected network that is close to the ideal graph even in the beginning, when there are few nodes.

Indexing

Maintaining and accessing an index is a difficult aspect of current distributed networks. An index must be of such a form that it allows high availability and low latency. Furthermore, the index must allow high availability and be load balanced.

Flooding the index to all nodes is a simple possibility. USENET does this in its purest form, while Summary Cache and OceanStore use Bloom Filters. Bloom Filters cut the storage requirements for building an index, but only by a constant factor: they still require O(n) space, where n is the number of items in the index.

Another form of flooding is multicast, which can be optimized so that each server receives each piece of information only some small constant number of times, even once with perfect reliability.

Other flooding solutions also exist. Gnutella is perhaps the best-known network that builds no index, but instead floods searches to all nodes. In a sense, Gnutella is the dual of USENET, which floods the index and keeps searches local.

The SKYRIS model is remarkably simple: We embed the index within the existing routing infrastructure. We already have a routing infrastructure that allows high availability, low latency, and load balancing, using only local information, so it is natural to use the same system for indexing. Thus we create a globally known one-to-one map from documents to neighborhoods. We can do this by taking the neighborhood to be given by the first logn bits of the document's 160-bit SHA1 Unique ID (UID).

Having solved the access problem with routing, we are left with the maintenance problem. Now that we can use the routing protocol to determine which neighborhood indexes a file, we have the neighborhood build an index. Since the neighborhood is small, this portion of the index is small, and we are left with a simpler, known problem.

Node Insertion

When a new node arrives, it must be inserted in a given neighborhood in the network. One possible strategy would be to examine all possible neighborhoods, determine which one is the least full, and insert the node in that neighborhood. However, this strategy is clearly too expensive. We note that neighborhoods need not be exactly balanced; close enough is likely good enough. At the other end of the scale is random hashing, which needs no information but causes local variances in load.

Our method is to use best-of-d lookup with d probably equal to 2. We generate 2 hash values for a new node, based on the SHA1 hash of a public key generated for that node, and the node's IP address. We then poll both neighborhoods referenced by the hash values, determine which is most under capacity, and join that neighborhood. If they are both equal, we may choose randomly between the two.

In order to preserve the good properties of this setup (neighborhoods are far more balanced than in simple random hashing), we may choose each time a node dies in a neighborhood, N1, to randomly choose another neighborhood N2 and reassign a node in N2 to N1 if N2 has more capacity than N1.

Connectivity Manager

Our system approaches the basics of connectivity in the same way Gnutella and Freenet do. Each server may have a variable number of contacts, defined by the routing structure. Every so often (a fixed time interval, say $c_i$=10 seconds) one host pings the other, and the other responds. Connections may be either unidirectional or bidirectional. Thus we may consider a graph, in which each server is a node, and edges represent connections.

Since each server caches at least d levels, each server knows all servers within graph distance d, and it knows that all servers at distance i<d were alive within $ic_i$ seconds.

When a server's first-level contact goes down, the server must switch to a new first-level contact and also switch all $2^{d-1}$ contacts beyond this one in its tree of contacts. With excessively large d, this is time-consuming. Therefore we estimate d to be approximately 7.

Furthermore, in the presence of widely different bandwidths (modem speeds and broadband, for example) it is useful to have modems have smaller d, while broadband users have larger d. This requires increasing the number of contacts which broadband users have—for example, a broadband user with d=n can treat a modem user with d=n−1 normally, but if the contact is a modem user with d=n−2, the broadband user can only get half the required information and thus needs another modem user. The broadband user's traffic increases by a factor of two for each subsequent decrease in the contact's level. This can be further remedied by biasing the distance function so that broadband users choose other broadband users as their contacts; given this model, modem (or wireless) users may decrease their d considerably and limit themselves to the edge of the network.

Additionally, a node shall keep redundant backup first level contacts, slightly beyond d levels. Furthermore, when a node's contact goes down, a node's second or third level contacts are not necessarily down either (unless we have a network partition or some similar correlated event). Thus, a node can trade off larger d by slowly phasing out its old contacts while phasing in the new.

We do intend for a node not to purge all its old contacts, but rather to save them to disk. The main reason for this is to avoid network partitions: the SKYRIS network routing and indexing is fault tolerant and will survive even if a significant fraction of nodes suddenly disappear; therefore, in the event of a network partition, the SKYRIS system will also be partitioned. Hence, when the offending network link is reactivated, the two separate networks must recombine. Since neighborhoods are small, manageable networks, this can be accomplished using vector time (a standard distributed systems method), and can be accelerated by using Bloom filters to merge indices.

Hot Spot Management

If the Skyris system did not address the issue of popular content, a small number of hosts would get cornered into serving all the traffic.

Our biggest attack on the hot spots problem is to separate indexing from downloads. Thus, one neighborhood is responsible for indexing a file, and those who download the file are responsible for sharing the file with others. So, instead of having the neighborhood store binary files, we have them store a list of hosts that have those files. This reduces the burden to a number proportional to the amount of requests, rather than bytes served.

However, if left unchecked, the popularity of some content would still overload the index. The slashdot effect, which results when the popular news site Slashdot links to an article on a lesser web server, was one of the first well-known documented instances of such behavior.

Thus, we borrow an idea from many of the flooding networks, and design a way to bring information closer to the requesting nodes. In general this is not a problem, since all nodes are close to all nodes. However, in this case, bringing information "closer" has the side effect of increasing the size of the neighborhood. Thus we may reverse the contacts in the graph, and enlarge the set of nodes that index the information to include several nearby neighborhoods as well. That is, we use the intermediary nodes in the routing scheme to our advantage. A short list can be proactively broadcast from neighborhoods with c members to their $m \cdot 2^d$ in-links, resulting in the neighborhoods expanding to serve the need.

Multiple-Keyword Search Layer

Once we have single-keyword search, the obvious method of two-keyword search is to contact both neighborhoods, request both lists, and merge them. If we can sort the lists (either by UID or by popularity), merge takes O(n) time in the sizes of the lists. Another naive method would be to store lists containing word pairs. However, this takes $O(n^2)$ storage space, which we don't have. We certainly should cache results for common word pairs, but we may find that most multi-keyword searches are new.

In our bandwidth starved environment, however, we must have a better solution. For example, if the keywords "travel" and "napster" each have 1 million hits, and their intersection is tiny, then with each UID being 20 bytes long, a single search for the top 1000 hits could take 20 megabytes of network traffic for unsorted lists, or perhaps about 1 megabyte for sorted lists. This is a ridiculously large amount to transfer for a single search.

To solve this, we borrow a method from some of the most efficient flooding networks, and use Bloom filters. Each host retains Bloom filters of variable sizes for its index (since recalculating from disk is expensive), and sends only its Bloom filter instead of its list in order to do a merge. The second host uses logical AND on the Bloom filters, and then looks through its list, finding the top matches that are in the Bloom filter. Finally, since Bloom filters are lossy and will result in spurious hits, the second server sends the top $1000(1+\epsilon)$ matches back to the first host, which then double-checks them against its list. This requires 20 kilobytes of data for the top 1000 hits; if we reduce the number of search results allowed, that number decreases. We expect the Bloom filter size to be somewhere on the order of n to 2n bytes, for a savings of around 90 percent on transmitting the lists. Thus total network bandwidth usage for a two-keyword search is brought down to perhaps 200 kilobytes. This is still higher than we would like, but much better than several megabytes.

Simulations

We have built a simple simulator for scalability, as well as a much more complex simulator to measure fault tolerance. The fault tolerance simulator actually implements the entire routing protocol, with the exception of the local indexing. It is based on queueing time, the standard way to simulate a network or a chain of events—the simulator contains a global priority queue of events, sorted by time. New events are placed in the queue to occur at some point in the near future, and after each event is handled, time instantly fast-forwards to the next event time.

Recall that for a network with 2' neighborhoods, and d levels of caching, theory reveals that the maximum number of hops (messages from one machine to the next) to do a search is $$\left\lceil \frac{\log n}{d} \right\rceil,$$

with the average being near $$\frac{\log n}{d+1}.$$

Note that Chord achieves a similar result but with d=1, and its lack of neighborhoods increases the time by approximately 3 more hops, while and Freenet and OceanStore are a constant factor worse. Thus, being able to set d=7 gives us an average speedup of a factor of approximately 5, which is highly significant in this setting, being the difference between extreme slowness and a reasonably quick system.

Scalability simulations reveal results that align closely with the theory, and show Skyris' advantage over the other O(logn) systems. For 1 million neighborhoods of size 64 (64 million machines!), Skyris can route messages to the index in 2.9 hops, while Chord (which couldn't exist on such a large network anyways without the nodes being highly reliable) takes 13.5 hops, and other projects fare worse. Even for a smaller network of 64,000 hosts, Skyris' routing takes 1.9 hops, while Chord takes 8.5, and OceanStore and Freenet should take closer to 16 hops.

Fault Tolerance simulations reveal that the network is highly fault tolerant. Three properties of the network make it highly fault tolerant: firstly, each machine has numerous secondary contacts to fall back upon if its primary contacts fail; secondly, information about these contacts is very frequently propagated in a manner near the most efficient possible, and finally, the deflection penalty is small, since all machines have a short path to all machines in the routing structure.

Applications

Skyris' technology is able for the first time to build a platform for large-scale, reliable network services running on users' devices. This platform provides the useful primitive operation of a reliable index, which can be used for many applications, many of which are new due to the distributed nature of the index. The applications include the following:

Distributed Content Distribution. Skyris' platform for the first time allows reliable content distribution on a large scale using the capacities of users' devices, such as PCs, notebook computers, or wireless devices such as PDAs or cell phones. Skyris' revenue model involves charging content providers on a per bandwidth or per unit model. Charging consumers for certain downloads, as in pay-per-view, is also possible.

File Sharing. File sharing includes sharing video, audio, and other documents with a small group of people or with the world. It is a simple form of content distribution, in which the content is static. Skyris supports file sharing with keyword search.

Distributed Computing. Skyris' distributed index can act as a reliable hash table, which can be useful to schedule tasks in a distributed computing environment.

Distributed Knowledge Management. Distributed Knowledge Management includes applications for interacting and sharing documents among coworkers. Existing solutions have limited scalability due to indexes with limited scalability; Skyris' distributed index can provide a scalable distributed platform for knowledge management.

Distributed Databases. Skyris' reliable neighborhoods allow one to build wide-scale distributed databases. The major activity of a database is in the transaction; Skyris' architecture can be adapted for use by a database through the use of two-phase commits, with neighborhoods being responsible for objects according to the hash function.

Hierarchies of Content. Most content on the internet is not single documents, but rather hierarchies, which are usually modeled by folders in filesystems. The Skyris system can be adapted to serve hierarchies in a distributed manner. The trivial way is to mark all content in a hierarchy with the hash of the root, in order to serve the content from a single place. A more scalable way is to contain the hash value of an object's parent in the object.

Security. Since we are using a secure hash, it is simple to rely on this hash in order to trust that content the user downloads matches the hash in the index. We can furthermore hash blocks of small size, say 64 kilobytes, and then hash the hashes to achieve a secure hash which is resilient against errors when different blocks are transmitted from different hosts. Then the problem reduces to whether one can trust the indexed data. In order to solve this problem we can use a public key infrastructure, and may use Skyris as a trusted third party. The system can sign content with a public key, and insert with the hash of the encrypted content.

Hybrid Network. With this decentralized infrastructure built, it is simple to insert some number of servers into the network, either acting as a single centralized entity or with some simple failover mechanism or even running a Skyris decentralized network of their own. These servers may be used to provide additional capacity, to provide geographic location services, or to run other services, such as an index of content. They may be assumed to be more reliable than a typical client machine, although any networked resource has some measure of unreliability.

Computational Resources. Since Skyris' network consists of a program which runs on users' PCs, it is possible to integrate into the network computationallyintensive projects, such as protein folding or other massively parallel computations which previously would have run on supercomputers. Skyris' index allows a reliable distributed hash table primitive which is available for computationally intensive programs. Such a primitive can allow better job scheduling or load balancing for computational jobs.

Traffic management A distributed geographic or network location service can be built on top of the network or accessed from various central servers. This service can be used when choosing which client to download from, in order to conserve bandwidth.

Motivating users The value received by Skyris from users' running the application is too low to consider direct payments to users at the moment, although for more value-added tasks, such a scheme could be implemented, for example for cash back when shopping for expensive items. Other more effective ways to reward users for participating in a distributed system include lotteries and donating to charities chosen from a list by the user. Teams donating to charities or playing in lotteries can also be used.

Conclusion

Skyris' core level of infrastructure, based on new algorithms, is both globally scalable and highly fault tolerant. These two properties are not found in other distributed networks, which must make choices between being scalable but not fault tolerant, such as the inter-domain routing protocol BGP, or being fault tolerant but not scalable, such as the RON project at MIT, which is able to achieve better routing on a small scale than BGP.

Skyris' scalability and fault tolerance allow the infrastructure to create new applications that were previously impossible—reliable network services running on unreliable desktop machines, based on a flexible primitive, the distributed directory service.

Pseudo Code Embodiment 8

FIG. 9 illustrates the data structures 900 that are stored in association with the Skyris software 134 shown in FIG. 1.

This data includes a contact list 902 which includes a list of direct contacts 904, a list of indirect contacts 912, and a shared contact list 918. The direct contact list stores the UID, or hash address value for each direct contact of the current node, as well as its network, or IP, address 908, and information about its contact status history 910. The contact status history 910 provides information about how many attempts that have been made to contact the node in the recent past have failed, so that if more than a certain number of attempts to contact a given direct contact have failed, the current node will know that it needs to replace that given direct contact with a new direct contact.

The indirect contact list includes for each indirect contact it's UID 914 and its network address 916.

The shared contact list is a list of other nodes for which the current node is a direct contact, and it includes for each such other node a list of all the current node's contacts that the other node has been given by the current node in a process such as that which was discussed with regard to FIG. 8. As will be explained below the shared contact list is used to enable a node to provide to another node update information about any contact that it has provided to that other node.

The shared neighborhood data 922 shown in FIG. 9 lists the data which is shared by all nodes that belong to a common neighborhood. The fact that this data is shared by a plurality of nodes provides redundancy that tends to ensure that such information is not lost even though nodes may be leaving and entering the neighborhood at a relatively high rate.

The shared neighborhood data includes a neighborhood address mask 924, which contains the set of most significant bits which are shared by all members of the current node's neighborhood. If the current node receives a request relating to a given hash address, and if the most significant bits of that hash address match the current node's address mask, the current node will normally respond to the request directly, since it, like all other nodes in its neighborhood, should have a copy of all information relating to that hash address.

The shared neighborhood data also includes a rumor list 926. As is indicated at 928 this is a list of the UIDs, or hash addresses, of all nodes in the neighborhood, including the current node, and it includes in association with each such hash address, a list of all the recent rumors that have originated from that node. As is indicated 933–934 it includes for each such rumor a timestamp indicating its time of origin and the content of the rumor. Such rumors are used to convey all the information which is to be commonly indexed by the nodes in the neighborhood as well as other communications which are relevant to the operation of neighborhoods.

The shared neighborhood data includes a keyword entry list 936 for each of a plurality of keywords that can be used to index data objects such as files. For each such keyword entry a list of associated files 938 is stored. This list includes for each file the file's hash value 940, the file's named 942, the file's size 944, the file's type 946 (such as whether it is a text file, and audio file, a video file), other descriptive text based metadata 948, the number of nodes storing a copy of the file 950, and a list of the other keywords that are associated with the file, 952. A keyword entry also stores an ordered list of the files associated with the keyword, ordered by the number of nodes that stored the file, as indicated 954. This is used to help the keyword entry determine which files are most popular, as indicated by the number of times that they are stored in the network, and to give preference in keyword indexing to those files.

The shared neighborhood data also includes a file entry list 956. This list includes for each of one or more file entries a hash value 958, a list of hash value chunks 960, a list of keywords associated with the file 962, and a list of nodes storing the file 964. The list 964 stores for each nodes storing a copy of the file the node's IP address 966, that node's port number 968, the Internet connection speed 970 for the node, the network location of the node 972, which is used for determining the proximity of the pair of nodes so as to determine which copy would be most appropriate for download to a given requesting node. The entry for each node storing a copy of a file also includes an indication of whether or not the node is behind a firewall, and if so it's relay contact information 974, and an entry expiration date 976, which is a time at which the entry for the given copy of the file will be removed from the list of nodes storing the file unless a refresh message is received from that node indicating that the copy is still available at its location.

As is indicated at 978 in FIG. 9 if a given node stores a copy of a given file, of the type that is referenced in the list of nodes storing the file 964 described above with regard to the shared network data, that node will have an entry for that copy in a list of file copy entries 980. Each such file copy entry includes the file's hash value 982, a list of the hash values of each of a set of chunks, or sub-portions of the file, which in the preferred embodiment are each approximately 128 kilobytes long, the actual contents of the file itself 986, and a list of keywords 988 associated with the file. The file copy entry also includes other text based metadata associated with the file, and an index refresh time which corresponds to the entry expiration date 976 described above in the file entry in the shared network data. This index refresh time is preferably set to shorter periods of time when the file is first stored on a given node and its refresh time grows longer as the length of time the file has been continuously available on that node grows. The consecutive refresh number 994 shown in FIG. 9 indicates the number of refresh periods that the file copy has been continuously available to the network from the current node, and it is used in determining how long index refresh times should be set. As is described above each node should refresh the entry expiration date 976 associated with each of its files, by the index refresh time so as to prevent the entry for any associated file copies from being removed from the list of nodes storing a copy of those files 964 that has been described above.

FIG. 10 illustrates how a node enters the Skyris network, either when it is entering it for the first time or reentering it after having left the network.

First function 1002 establishes contact with a known node in the network. Commonly the known node is one or more nodes contained in a list of nodes that has been given to the node which is trying to enter the network. For example a node commonly enters the network after having downloaded Skyris software, and such software normally would contain a list of a plurality of known nodes that can be called to for the purpose of function 1002. In some embodiments the known node is one of one or more central servers that are associated with the system and which are sufficiently reliable that at any given time at least one or two of such known servers would be available. In other embodiments a new node is given a network name which is mapped to an actual current node by use of dynamic name resolution, a service that is provided to dynamically map a URL to an IP address. This service is available on the Internet from various service providers for a fee.

Once the current node has established contact with a known node in the Skyris network function 1004 generates two or more new network hash addresses. Then functioned 1006 causes functioned 10008 to perform a hash address search, of the type that will be described below with regard to FIG. 11, for a node in a neighborhood that handles the portion of the hash address space corresponding to each such new hash address.

The hash address search perform by functioned 1008 queries each node that is found to be in the neighborhood of one of the potential new hash addresses for the neighborhood mask associated with that node's neighborhood. Once such a mask has been returned in association with each of the potential hash addresses, function 1010 selects the neighborhood returned by the searches having the fewest high order bits in its neighborhood mask. Normally this will correspond to the neighborhood in the region of the address space having the smallest population. Once this selection is been made function 1012 assigns the current node to the hash address corresponding to the selected neighborhood. Function 1014 then downloads a complete copy of the shared neighborhood data 922 described above with regard to FIG. 9, from the node contacted in the selected neighborhood by the search of function 1008. Once this has been done function 1016 creates a contact list for the node's new hash address, as will be described below with regard to FIGS. 12 and 13.

FIG. 11 describes how a node performs a hash address search of the type described above with regard to function 1008.

The hash address search 1100 shown in FIG. 11 starts by testing to see if the neighborhood address mask associated with the node performing the search matches the high order bits of the hash address which is to be searched for. If so function 1102 causes functioned 1104 to return from the search with the current node's UID and neighborhood mask and network address. This is done because if the current node's address mask matches the high order bits of the hash address being searched for, it should have a copy of all of the shared neighborhood information necessary to deal with the searched for hash address.

If the test of 1102 is not met function 1106 makes the current node's contact list the current contact list for the purpose of the iteration performed by function 1108.

Function 1108 performs an until loop until one of its iterations gets a return from another node that includes a neighborhood mask matching the high order bits of the search address, the UID of a node having that matching neighborhood mask, and that node's IP address.

The loop of function 1108 causes functions 1110 through 1120 to be performed. Function 1110 tests to see if there is a set of one or more contacts in the current contact list to which a search request has not previously been sent by an iteration of the loop 1108. If there are one or more such untried contacts, function 1112 sends a search request for the hash address being searched for to that one of such untried contacts who's UID value has the largest number of most significant bits matching the address being searched for.

If the node does not get a response to the search request within a timeout period functions 1114 and 1116 start again at the top of the until loop 1108, which will cause function 1112 to send a search request to another entry in the current contact list being used by the search.

If a reply is received in response to a search request sent by function 1112 and that reply does not contain a matching neighborhood mask but does contain a new contact list, function 1118 and 1120 merge the new contact list with the current contact list. If the node to which a search request was sent by function 1112 is closer to the hash address being searched for than the current node, the contact list which is merged into the search's current contact list by function 1120 will probably contain a set of contacts which are closer to the hash address being searched for than those that were previously in the search's current contact list.

Normally after substantially less than log(n) iterations through the until loop of function 1108, where n and is equal to the number of nodes in the Skyris network, a reply will be received in response to one of the search request sent by function 1112 that includes a neighborhood mask matching the search address, along with the UID and IP address of the node returning that matching mask.

FIG. 12 describes the contact list creation function 1200 which is used to create a contact list for a new node.

The function includes a loop 1202 which is performed for each possible value of index i ranging from 0 to k. In some embodiments k is the log of the number of nodes in the neighborhood. In other embodiments, such as the one shown in this pseudocode, k is equal to the length of the neighborhood mask for the node for which the contact list is being created.

For each iteration of the loop 1202 function 1204 creates a new UID, or hash address value, by performing functions 1206 to 1210. Function 1206 copies the first i−1 significant bits from the current node for which the contact list is being created. Then function 1208 inverts the $i^{th}$ most significant bit of the current node's UID. Then function 1210 picks a random value for all of the bits less significant than the $i^{th}$ bit in the new hash value to be created.

Once this new UID value has been created function 1212 calls the new direct contact creation function 1300 shown in FIG. 13.

As shown in FIG. 13 the new direct contact creation function is comprised of functions 1302 to 1320. The function at 1302 performs a hash address search of the type described above with regard to the FIG. 11, for the UID for which the new direct contact creation function has been called. As has been described above with regard to FIG. 11 this function will search to find a node in a neighborhood that handles the UID is being search for. Once a hash address search has returned information about such a node, function 1304 makes that node that has been returned by the search of function 1302 as the $i^{th}$ direct contact for the current node, where i is equal to the number of the most significant bit by which the returned contact differs from the new UID of the current node.

Functions 1306 through 1312 store the UID, the IP address, and an initially empty contact status history entry for the new direct contact. This corresponds to the information 906 through 910 which is indicated as being stored for each direct contact in FIG. 9.

Once the $i^{th}$ contact has had an entry created for it in the current node's data structure function 1314 sends a contact request to the $i^{th}$ contact requesting a list of indirect contacts having the same most significant bits as the $i^{th}$ contact up to and including the $i^{th}$ bit, and having all possible combination of the d−1 most significant bits. This corresponds to the type of contact request which was discussed above with regard to FIG. 8. When the direct contact returns the requested indirect contact, functions 1316 through 1320 cause the UID and IP address of each such indirect contact to be stored in the indirect contact list 912, described above with regard to FIG. 9, in the current nodes data structures.

FIG. 14 is a contact request response function 1400 which a node performs when it receives a contact request of the type sent by a node when performing function 1314 described above with regard to FIG. 13.

When the contact request response function is performed a function 1402 finds list of all node contacts that have the same most significant bit through the $i^{th}$ bit identified in the request and have all possible combinations of the d−1 next most significant bits. This is similar to the list of contacts as was discussed above with regard to FIG. 8. Once this list has been created function 1404 sends this list of contacts to the requesting nodes. Then function 1406 is performed for each contact node sent to the requesting node by function 1404. For each such contact node that has been sent to the requesting node function 1406 causes function 1408 to place an entry in the node's shared contact list under the requesting node, recording the contact that has been sent to it. As will be described below with regard to FIGS. 15 and 16, the shared contact list entries are used to enable a node to know which other nodes it has to update when it finds that a contact in its contact list is no longer valid.

FIG. 15 describes the direct contact status update function 1500. This function includes a function 1502 which every n seconds performs a loop 1504 for every direct contact of the current node. In one current embodiment n equals 5 seconds.

For every direct contact of the current node function 1504 causes function 1506 through 1526 to be performed. Function 1506 attempts to communicate with the current direct contact of the current iteration of the loop 1504. If no communication is established in response to the attempt of function 1506 function 1508 causes function 1510 to 1526 to be performed. Function 1510 records that communication has failed with the contact. Then function 1512 tests to see if this is the $n^{th}$ consecutive attempt in which attempted communication with the contact has failed. If so it determines that the node is no longer a valid direct contact and causes function 1514 to 1526 to be performed. It should be appreciated that in other embodiments of the invention different criteria can be used to determine exactly when a direct contact should be considered to be no longer valid.

Functions 1514 to 1518 create a new UID to be used by a new direct contact to replace the one that function 1512 has determined to be invalid. This new UID includes the same most significant bits as the direct contact to be replaced up to and including the first most significant bit that differs from the UID of the current node. The remaining bits of the new UID are picked at random.

Once this new UID has been created function 1520 calls the new direct contact creation function 1300 described above with regard to FIG. 13 for the new UID.

Once function 1300 has found a new direct contact from a given node in a neighborhood with a neighborhood mask that matches the most significant bits of the new UID, it will make that given node the new direct contact to replace the direct contact which function 1512 has found to have failed, and it will obtain a corresponding set of indirect contacts associated with the new direct contacts portion of the hash address space. The function 1300 will cause this new direct contact and its corresponding indirect contacts to be entered into the current nodes contact list.

Once this has been done function 1522 performs a loop for each other node having an entry for a replaced contact in the current node's shared contact list 918 described above with regard to FIG. 9. For each such node to which the current node has previously sent the direct contact being replaced or one of its associated indirect contacts, function 1524 sends a contact change message to that other node indicating that the replaced contact has been replaced, identifying the contact that is to replace it by UID and IP address. A function 1526 then updates the shared contact list to reflect that the new replacement contact has been sent to the other node that has just been notified about the replacement.

FIG. 16 illustrates the contact change message response function 1600 which a node performs when it receives a contact change message of the type described above with regard to function 1524 of FIG. 15.

When a node receives such a contact change message function 1602 it replaces the replaced contact indicated in the message with the new replacement contact indicated in the message in the node's contact list 902, described above with regard to FIG. 9.

Then a function 1604 performs a loop for each other node associated with the replaced contact in the current node's shared contact list. For each such node a function 1606 sends a contact change message to that other node indicating the replaced contact and the UID and IP address of the contact that is replacing it. Then a function 1608 updates the current node's shared contact list to indicate that it has sent the new, replacing, contact to that other node.

It can be seen from FIGS. 12 through 16 that operations in the Skyris network allow a node to develop a relatively large set of contacts that can be used to more rapidly search for and find a node that can handle a given hash address value, without requiring a large amount of computation or communication. This is because a node commonly obtains a large majority of its contacts merely by copying them from other nodes, and is given information by other nodes that updates its contact list when one or more nodes that have been given to it by other nodes have been found to fail. This results in the system that can search a huge address space very rapidly and yet requires relatively little communication and computational overhead to maintain the large number of contacts that make it possible to do so. The fact that the network appropriately and efficiently relays information about changes in contacts only to the nodes that need to know about them, enables the system to operate efficiently even in network's were a high percent of the nodes enter and exit the network with relatively high frequency.

FIGS. 17 and 18 relate to rumor communication, which is a very efficient mechanism for communicating information between nodes of a given neighborhood, or logical node, of the Skyris network.

FIG. 17 illustrates the rumor creation function 1700. If there is a change to a given node's shared neighborhood data, function 1702 causes functions 1704 to 1708 to be performed. As will be described below with regard to FIGS. 25 and 26 such a change commonly occurs when new information is indexed in a given node.

Function 1704 creates a new rumor detailing the change in the node's shared neighborhood data. Function 1706 labels a rumor with a given node's UID and a timestamp corresponding to the time at which this new rumor was created. Then function 1708 places this rumor on the given node's rumor list under the given node's own UID.

FIG. 18 describes the rumor propagation function 1800 which is used to communicate rumors between nodes of a given neighborhood.

Function 1802 performs a loop every n seconds, which in one embodiment is 5 seconds. This loop comprises forming an inner loop 1804 for each node in the current node's rumor list. For each such node functions 1806 to 1830 are performed.

Function 1806 performs a loop for each rumor associated with the current node in the iteration of the loop 1804, in which a test to see whether that rumor is older than a given timeline, and if so it causes function 1808 to delete it. This is done to remove old rumors from the node's rumor list so as to prevent that list from growing to be wastefully large over time.

Next function 1810 tests to see if the current node of the current iteration of loop 1804 is the current node executing function 1800, and whether or not there are any rumors associated with its UID in the current node's rumor list which are newer than a second timeline. If there are no such relatively recent rumors associated with the current node in the current node's UID list function 1812 adds a "still here" rumor to the current node's rumor list with a current timestamp so that rumor propagation will inform other nodes that the current node is still functioning as part of the neighborhood.

Next function 1814 tests to see if the current node of the loop 1804 is another node and that other node has no rumor associated with its UID in the current node's rumor list that is newer than a third timeline. If these conditions are matched it means that the current node has not heard anything about that other node for a period sufficiently long as to indicate that other node is no longer participating in the current neighborhood and thus function 1816 deletes that other node from the current node's rumor list.

Once the operation of the loop 1804 is complete function 1818 attempts to communicate with another node that is randomly picked from the current node's rumor list. If communication is achieved with a randomly picked node function 1820 causes functions 1822 through 1827 to be performed.

Function 1822 tests to see if the node UID on each side of the communication matches the other node's neighborhood mask. If one side's neighborhood mask contains the other, that is, has a smaller number of significant bits, then the node with a smaller number of significant bits exchanges only rumors that correspond with node UID's that match the other node's longer neighborhood mask. The node with the longer neighborhood mask will send all rumors relating to the node UID's in its rumor list to the node with the shorter neighborhood mask since the UID's of all such nodes will fall within the portion of the hash address space corresponding to the other node's shorter neighborhood mask. If any of the bits of the neighborhood masks of the nodes in the communication conflict with each other than neither node will communicate any rumors to the other.

FIG. 19 illustrates a neighborhood splitting function 1900. This function includes a test 1902 which tests to see if the number of neighbors listed in the current node's rumor list exceeds an upper neighbor limit. In a current embodiment of the invention nodes try to keep their neighborhoods in a population range between roughly 32 and 64 nodes. In such a case the upper neighbor limit would be 64. If the test of function 1902 is met functions 1904 through 1908 are performed.

Function 1903 increases the length of the current node's neighborhood mask by one bit. Function 1904 adds a rumor to the node's rumor list under the current node's UID indicating that the current node has extended the length of its neighborhood mask by one bit.

As explained above rumor propagation will cause this rumor to be sent out to other nodes in the current node's neighborhood. If the current node is one of the first nodes to sense that its neighborhood's population has exceeded the upper neighbor limit, most of the other nodes in its former neighborhood will have a shorter address mask than the current node does as a result of function 1903. As stated above with regard to the rumor propagation function FIG. 18, such other nodes having shorter neighborhood mask will receive rumors from the current node since that portion of the address space corresponding to its new neighborhood mask falls within the portion of the address space represented by their shorter address mask. This will cause such other nodes to receive the message that the current node has decided to split its neighborhood. But any such nodes whose UID's do not match the new longer address mask of the current node will no longer send rumors to the current node, since they have been informed that it is no longer interested in their half of their current neighborhood.

When a node increases the length of its neighborhood mask as indicated by function 1903 function 1906 tests to see if the current node includes a full contact list, that includes a direct contact and a corresponding set of indirect contacts in which the first most significant bit that differs from the address of the current node corresponds to the position of new bit that has just been added to the current node's address mask.

If the test of function 1906 finds the current node does not have such contact entries, function 1908 calls the new direct contact creation function 1300, described above with regard to FIG. 13, to create such a direct contact and a corresponding set of indirect contacts.

Although it is not shown in FIG. 19, if a node that detects that its neighborhood is exceeding the upper neighbor limit, as described above with regard of function 1902, but also finds that splitting the neighborhood would cause one of the two halves to have an address below the lower neighbor limit, it will respond by generating messages that cause members of the current neighborhood to re-enter that neighborhood in its other half, so as to correct the population imbalance that causes the neighborhood to be too large, while causing one of its halves to be too small.

FIG. 20 describes the neighborhood-split rumor response function 2000. As indicated by function 2002 if a current node receives a rumor associated with another node's UID indicating that that other node has changed its neighborhood mask so as to no longer match the current node's UID, functions 2004 to 2008 are performed. These functions place an indication in the other node's entry in the current node's rumor list indicating that the other node has left the current node's network as of the timestamp associated with the rumor indicating the other nodes change. And it indicates that no rumor communication should be made from the current node to that other node until a new or rumor is received from that other node saying that it has a neighborhood mask that matches the current node's UID.

FIG. 21 describes the neighborhood merging function 2100. If the number of neighbors in a node's rumor list falls below a lower neighbor limit function 2102 causes a loop 2104 to be performed. The loop 2104 is performed for each of one or more randomly picked hash addresses in the other half of the part of the hash space defined by one less bit in the neighborhood mask in the current node's neighborhood mask.

A function 2106 performs a hash address search for each such randomly picked hash address. A function 2108 tests to see if the node found by the hash address search has a longer neighborhood mask than the current node. If this is the case functions 2110 is performed.

Function 2110 probabilistically decides whether to send a message to the other node returned by the search asking it to re-enter the network with UID corresponding to the current node's neighborhood mask. Such a message is sent with a 1/n probability, where n the size of the nodes neighborhood. The use of such a probabilistic determination of whether or not such a message to be sent is made so as to present the possibility all of a large number of nodes from receiving such messages in a fairly short period of time, because this might lead to the neighborhood receiving such messages with an under population.

If the test of function 2208 is not met, the neighborhoods that should be combined can be combined merely by shortening their respective neighborhood masks by one bit, and thus function 2213 causes functions 2214 through 2222 to be performed.

Function 2216 sends a merge request the via rumor communication to nodes in the current node's neighborhood. This will cause all nodes that receive this rumor to perform the merge request response function of FIG. 22 themselves. Then function 2218 causes the current node to decrease the length of its neighborhood mask by one bit.

Function 2220 deletes from the current node's contact list the direct contact that first differs from the current node's hash address by the lowest order bit, and all of its associated indirect contacts. Then function 2220 causes the current node to perform its next rumor communication with a node from the other half of the new neighborhood, so that the current node will receive all shared neighborhood data that up until the merger has been indexed by the other half of the newly formed neighborhood, but not by the current node's half.

FIG. 23 illustrates the new file network entry function 2300. This function is executed by a node when it seeks to enter a file into the Skyris network, which, as far as it knows, has not been entered into the network before.

The new file network entry function includes a function 2302 that breaks the file to be entered up into one or more chunks each having no more than a given size. In one embodiment of the invention file chunks are limited to 128 kB. Next the function 2304 performs a hash on each chunk. Next function 2306 sets the files hash value to a hash of the chunks associated with the given file.

After this is done a function 2308 finds a list of one or more keywords to be associated with the file. Different functions can be used for obtaining keywords for different types of files. For example many non text files would base their keywords largely on the title of the file. Files that contain metadata would often have their keywords defined by such metadata. Pure text files might be defined by keywords corresponding to text words in the file which occur with a much higher relative frequency in the text file than they do in files in general.

For each such keyword found by the function 2308 function 2310 and 2312 find its corresponding hash value. Next a function 2314 calls the copy file network entry function 2400 which is illustrated in FIG. 24 to complete the entry of the file into the network.

As shown in FIG. 24 the copied file network entry function includes a function 2402 that forms a hash address search for the hash value associated with the file for which the function of FIG. 24 is being performed.

When a hash address returns with the address of a node handling the portion of the hash address space corresponding to the files hash value, function 2404 sends a file index insert request for the file to that node, along with the current nodes IP addr 2412 that sends a keyword index insert request for the keywords hash value to the node returned by the hash address search, which request includes the current nodes IP address and other information to be included in a file entry for the current file. Then a function 2406 stores the number of nodes storing the current file that is returned in response to the file index insert request.

Next function 2408 performs a loop for each of the current file's keywords. This loop includes function 2410 which performs a hash address search for the keyword's hash value, and function 2412 sends a keyword index insert request for the keyword's hash value to the node returned by the hash address search. This request includes the current node's IP address and information for a keyword entry associated with the current keyword of the loop 2408 including the number of nodes storing the current file returned by the file index insert request.

Then function 2414 causes the items of information indicated by numerals 2416 to 2424 to be stored on the current node in association with the hash value of the file for which the copied file network entry function is being performed. This includes a list of the hash values of the current file's associated chunks, the data of the file itself, the list of keywords associated with the file and their hash values, an index refreshed number that has been set to 0 and index refresh time which is initially sat with a short refresh length, that indicates the time by which the current node must refresh the indexed file entry that has been created by the network for the copy of the file stored on the current node.

FIG. 25 illustrates the file index insert request response function 2500. This is the function that is performed by a node that receives a file index insert request of the type that is sent by function 2404 described above with regard to FIG. 24.

When a node receives such a file index insert request, function 2502 tests to see if there is any file entry for the requested file on the current node. If not functions 2504 and 2506 are performed. Function 2504 creates a file entry for the file, including information about the node originating the request. This corresponds to the file entry data 956 described above with regard to FIG. 9. Function 2506 places the rumor in the node's rumor list under the node's own UID with the current timestamp containing the new file entry. This corresponds to the rumor creation described above with regard to FIG. 17.

If the test of function 2502 finds that there already it is a file entry for the file of the request being responded to, function 2508 causes functions 2510 and 2512 to be performed. Function 2510 adds to the list of file copy entries for the current file a new file copy entry indicating the network location information for the node that is sent the request that is being responded to. Then function 2512 places the rumor in the current nodes were list under the node's own UID with a current timestamp containing the new file copy entry information. This also corresponds to a rumor creation of the type described above with regard to FIG. 17.

When the work of the file index insert response request is been complete, function 2514 returns information to the requesting node indicating the number of file copy entries for the file corresponding to the request.

FIG. 26 describes a keyword index insert request response. This is somewhat similar to the response function described in FIG. 25, except that it describes a node's response to a request to insert keyword index information, rather than file index information.

When a node receives a keyword index insert request, of the type that is generated by function 2412 described above with regard to FIG. 24, function 2602 tests to see if there is already any keyword entry for the keyword associated with the request on the current node. If not function 2604 creates a keyword entry of the type described above with regard to the keyword entry list 936 described above with regard to FIG. 9 for the current keyword.

If on the other hand there already is an entry for the current keyword function 2606 tests to see if the number of nodes storing the file accompanying the keyword request is above a minimum required number. In a current embodiment a keyword entry only stores information about the 5000 most frequently stored files that are associated with that keyword. In other embodiments different requirements could be used to determine which files are to be index in association with a given keyword.

If the test of function 2606's passes functions 2608 through 2616 are performed. Function 2608 cast to see if there is any associated file entry for the file associated with the current keyword in the keyword entry on the current node for that keyword. If so function 2610 creates a new associated file entry for the file associated with the current request in the current keyword entry's list of associated files.

If the test of function 2608 finds that there is an associated file entry for the requested file in the current keyword's keyword entry, function 2612 causes functions 2614 and 2616 to be performed. Function 2614 replaces the count of nodes storing the file to the count contained in the current keyword index insert request, and function 2616 reorders the file's location in the ordered list of files by storage count, 954 shown in FIG. 9. This is the list that is used by the test 2606 determine whether or not the number of copies associated with a given file falls within the top 5000 largest number of copies for any files associated with the current keyword.

Before the keyword index insert request response function is complete function 2618 places a rumor in the current node's rumor list under the nodes own UID with the current timestamp containing any changes to a keyword entry that have resulted from the response to the keyword index insert request. This also corresponds to the type of rumor creation described above with regard to FIG. 17.

FIGS. 27 through 29 illustrate functions used by the network to increase the chance that information that is indexed by the networks distributed index is currently valid.

FIG. 27 illustrates the file expiration response function 2700. This function includes a test 2702 to test to see if the expiration date for a node-storing-file entry in the list of nodes storing a copy of the file has expired. If so it causes functions 2704 through 2714 to be performed. Function 2704 deletes the node-storing-file entry of the type described above in association with the list 964 shown in FIG. 9. Then a function 2706 test to see if the list of nodes storing the file has been made empty by the deletion. If so functions 2708 through 2714 perform. Function 2708 forms a loop for each keyword associated with the file entry. This loop comprises functions 2710 which performs a hash address search for the hash of the keyword, and function 2712 which sends a message to the node returned by the keyword search in forming it to remove the file from the associated file list of the keywords associated entry on that node. Next a function 2704 response to the situation detected by function 2706 by deleting the associated file entry.

FIG. 28 illustrates the file index refresh function 2800 that is performed by an individual node storing a copy of a given file. If the file index refresh time indicated by the valued 992, shown in FIG. 9, stored in association with a given copy of the file has expired more than x time ago, function 2802 will cause function 2804 to perform a copy to file network entry, of the type described above with regard to FIG. 24, to be performed for the file so as the closet to be reentered into the networks distributed indexing scheme.

Normally the time x used in the test of function 2802 corresponds to a slight time difference that normally exists between the index refreshed times stored by nodes storing copies of files and the associated expiration dates stored by the nodes that index the location of file copies. Thus if the test of function 2802 is not met, the files index refresh time has not yet expired. It this is the case function 2806 task to see if the files index refreshed time is about to expire. If so function 2808 and 2810 or performed. Function 2808 sends an index refreshed message to a node indexing the file copy with a consecutive refreshed number to indicate to that node how far in advance the newly extended expiration date should be set. Function 2810 increments the files corresponding consecutive refreshed number 994, shown in FIG. 9, so that the node will be giving credit for having consecutively maintained a copy of the current file when the next expiration date extension is set.

FIG. 29 illustrate a file index refreshed message response function 2900 which is performed by node that receives any index refreshed message of the type described above with regard to function 2808 to FIG. 28.

If such an index refresh message is received from a node listed in the lists of nodes storing a file copy in the file entry for the file associated with the refresh message, functions 2902 and 2904 set a new expiration date for the node's copy of the file as a function of the consecutive refresh number associated with the refresh message. As described above, the length of time into the future at which the new expiration date is set is a function of the consecutive refresh number. When the consecutive refresh number is very low new expiration dates will be set only a few minutes into the future. As the consecutive refresh number grows the new expiration dates will be extended into the future by much longer periods of time such as as much as 12 or 24 hours in some embodiments.

FIGS. 27 through 29 illustrate functions used by the network to increase the chance that information that is indexed by the networks distributed index is currently valid.

FIG. 27 illustrates the file expiration response function 2700. This function includes a test 2702 to test to see if the expiration date for a node-storing-file entry in the list of nodes storing a copy of the file has expired. If so it causes functions 2704 through 2714 to be performed. Function 2704 deletes the node-storing-file entry of the type described above in association with the list 964 shown in FIG. 9. Then a function 2706 test to see if the list of nodes storing the file has been made empty by the deletion. If so functions 2708 through 2714 perform. Function 2708 forms a loop for each keyword associated with the file entry. This loop comprises functions 2710 which performs a hash address search for the hash of the keyword, and function 2712 which sends a message to the node returned by the keyword search in forming it to remove the file from the associated file list of the keywords associated entry on that node. Next a function 2704 response to the situation detected by function 2706 by deleting the associated file entry.

FIG. 28 illustrates the file index refresh function 2800 that is performed by an individual node storing a copy of a given file. If the file index refresh time indicated by the valued 992, shown in FIG. 9, stored in association with a given copy of the file has expired more than x time ago, function 2802 will cause function 2804 to perform a copy to file network entry, of the type described above with regard to FIG. 24, to be performed for the file so as the closet to be reentered into the networks distributed indexing scheme.

Normally the time x used in the test of function 2802 corresponds to a slight time difference that normally exists between the index refreshed times stored by nodes storing copies of files and the associated expiration dates stored by the nodes that index the location of file copies. Thus if the test of function 2802 is not met, the files index refresh time has not yet expired. It this is the case function 2806 task to see if the files index refreshed time is about to expire. If so function 2808 and 2810 or performed. Function 2808 sends an index refreshed message to a node indexing the file copy with a consecutive refreshed number to indicate to that node how far in advance the newly extended expiration date should be set. Function 2810 increments the files corresponding consecutive refreshed number 994, shown in FIG. 9, so that the node will be giving credit for having consecutively maintained a copy of the current file when the next expiration date extension is set.

FIG. 29 illustrate a file index refreshed message response function 2900 which is performed by node that receives any index refreshed message of the type described above with regard to function 2808 to FIG. 28.

If such an index refresh message is received from a node listed in the lists of nodes storing a file copy in the file entry for the file associated with the refresh message, functions 2902 and 2904 set a new expiration date for the node's copy of the file as a function of the consecutive refresh number associated with the refresh message. As described above, the length of time into the future at which the new expiration date is set is a function of the consecutive refresh number. When the consecutive refresh number is very low new expiration dates will be set only a few minutes into the future. As the consecutive refresh number grows the new expiration dates will be extended into the future by much longer periods of time such as as much as 12 or 24 hours in some embodiments.

It should be understood that the foregoing description and drawings are given merely to explain and illustrate, and that the invention is not limited thereto except insofar as the interpretation of the appended innovations are so limited. Those skilled in the art who have the disclosure before them will be able to make modifications and variations therein without departing from the scope of the invention.

The invention of the present application, as broadly innovationed, is not limited to use with any one type of operating system, computer hardware, or computer network, and, thus, other embodiments of the invention could use differing software and hardware systems.

Furthermore, it should be understood that the program behaviors described in the innovations below, like virtually all program behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the innovations are not meant to be limited to the exact functions and/or sequence of functions described in the FIGS. This is particularly true since the pseudo-code described in the text above has been highly simplified to let it more efficiently communicate that which one skilled in the art needs to know to implement the invention without burdening him or her with unnecessary details. In the interest of such simplification, the structure of the pseudo-code described above often differs significantly from the structure of the actual code that a skilled programmer would use when implementing the invention. Furthermore, many of the programmed behaviors which are shown being performed in software in the specification could be performed in hardware in other embodiments.

In the many embodiment of the invention discussed above, various aspects of the invention are shown occurring together which could occur separately in other embodiments of those aspects of the invention.

The invention claimed is:

1. A node in a distributed indexing network in which each node has an address in an index address space and in a separate network address space, said node comprising:

machine readable memory for storing program instructions and data structures;

one or more processors for executing program instructions stored in said memory;

program instructions stored in said memory for:

associating a subset of the index address space with the node;

maintaining a contact list, which stores the index space and network address for each of a plurality of contacts, each of which is another node in said indexing network;

treating a minority of said contact list as direct contacts and the rest of said contacts as indirect contacts;

attempting to communicate with each of the direct contacts with a minimum frequency, to determine whether or not that direct contact is still a member of the network;

responding to a determination that a given direct contact is no longer functioning as a member of the network by finding a new direct contact to replace that given contact and replacing the replaced direct contact in the node's contact list with the index and network address of the replacement contact;

wherein the node responds to a search request for a given index address that does not fall in the subset of the index address space associated with the node by using, as the next node to send such a search request to, the address on its contact list that is closest to the given address, whether that address is a direct or indirect address;

the node learns the index address and network address of each of the node's indirect contacts from an associated one of the node's direct contacts; and the node learns about changes in the state of a given indirect contact from the same direct contact from which it learned the indirect contact's index and network address.

2. A node as in claim 1 wherein:

said program instructions include instructions for responding to a request from another node for a set of contacts by sending the requesting node a subset of the node's contacts and storing a record that the node has sent said subset of contacts to the other, requesting, node; and wherein said node responding to a request determines that a given direct contact is no longer functioning as a member of the network also includes sending to any other node to which the node has previously sent the given direct contact in response to a contact request a message that the given contact has been replaced, including the index address and network address of the replacement contact.

3. A node as in claim 2 wherein said program instructions include instructions for responding to a message from another node indicating that a given indirect contact supplied to the node by said other node has been replaced by a new indirect contact having a given index and network address by:

replacing the given indirect contact in the node's contact list with the index and network address of the replacement node; and sending to any other node to which the node has previously sent the replaced indirect contact in response to a contact request a message indicating that the previous communicated contact has been replaced, including the index and network address of the replacement contact.

4. A node as in claim 1 wherein said node does not directly communicate with indirect contacts at a frequency greater than one tenth the minimal frequency with which it communicates with direct contacts for the purpose of determining whether or not that indirect contact is still a member of the network, and learns about changes in status of such indirect contacts through communications with direct contacts.

* * * * *